United States Patent
Sato et al.

(10) Patent No.: US 8,778,108 B2
(45) Date of Patent: Jul. 15, 2014

(54) LAMINATING APPARATUS AND LAMINATING METHOD THEREFOR, AND PRINTING APPARATUS

(75) Inventors: Fumio Sato, Kanagawa-ken (JP); Hiroyoshi Chin, Tokyo (JP); Tomonori Sumida, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 519 days.

(21) Appl. No.: 13/064,585

(22) Filed: Apr. 1, 2011

(65) Prior Publication Data
US 2011/0265931 A1 Nov. 3, 2011

(30) Foreign Application Priority Data
Apr. 28, 2010 (JP) .................. 2010-103167

(51) Int. Cl.
*B32B 41/00* (2006.01)
*B29C 65/02* (2006.01)
*B29C 65/00* (2006.01)
*B29C 47/92* (2006.01)
*B30B 15/06* (2006.01)

(52) U.S. Cl.
CPC ............. *B29C 65/02* (2013.01); *B29C 65/00* (2013.01); *B29C 66/8322* (2013.01); *B29C 2947/92438* (2013.01); *B29C 2947/92704* (2013.01); *B29C 47/92* (2013.01); *B29C 66/91* (2013.01); *B30B 15/064* (2013.01)
USPC ............. 156/64; 156/350; 156/351; 156/358; 156/362; 156/367; 156/378; 156/379

(58) Field of Classification Search
CPC .... B29C 65/00; B29C 65/02; B29C 66/8322; B29C 2947/92438; B29C 2947/92704; B29C 47/92; B29C 66/91; B30B 15/064
USPC ........... 156/64, 350, 351, 358, 362, 367, 378, 156/379
See application file for complete search history.

(56) References Cited

U.S. PATENT DOCUMENTS
2007/0235141 A1* 10/2007 Chin .......................... 156/552

FOREIGN PATENT DOCUMENTS
JP 2001105493 A * 4/2001
WO 99/21713 5/1999

* cited by examiner

*Primary Examiner* — Katarzyna Wyrozebski Lee
*Assistant Examiner* — Joshel Rivera
(74) *Attorney, Agent, or Firm* — Louis Woo

(57) ABSTRACT

A laminating apparatus is composed of a transporting device for transporting a card, a film supplying device for supplying a film, a compression bonding device for thermally compression bonding a laminate material on the film onto the card, a driving device for shifting the compression bonding device from a standby location to a compression bonding location, a film taking-up device for taking up the film, a first guide for guiding the film in a supply side of the film, a second guide for guiding the film in a take-up side of the film, and a third guide for guiding the film in an upstream side of the second guide and in a downstream side of the compression bonding device, wherein the third guide moves in conjunction with the compression bonding device.

10 Claims, 15 Drawing Sheets

LAMINATING APPARATUS AND LAMINATING METHOD THEREFOR, AND PRINTING APPARATUS

BACKGROUND OF THE INVENTION

1. Field of the Invention

This invention relates to a laminating apparatus and a laminating method therefore, and a printing apparatus, particularly, relates to a laminating apparatus for laminating a protective film on a surface of a card and a laminating method for the laminating apparatus, and a printing apparatus equipped with the laminating apparatus.

2. Description of the Related Art

Currently, a laminating apparatus for laminating a transparent film on a printed surface of a card is commonly utilized for the purpose of preventing various kinds of cards such as credit card and identification (ID) card from being altered, and further protecting information printed on a surface of a card from scratching or stains. Such a laminating apparatus is utilized in combination with a card printer, which prints personal data such as a facial portrait on a card, as well as utilized as a stand-alone apparatus.

One of printing apparatuses equipped with a laminating apparatus is disclosed in the Japanese publication of international patent applications No. 2001-520952 or PCT international patent application No. WO99/21713.

The printing apparatus shown in FIG. 15 disclosed in the Japanese publication of international patent applications No. 2001-520952 is one example of a card printer, which incorporates a laminating apparatus.

FIG. 15 is a plan view of a card printer according to the prior art.

In FIG. 15, the card printer is composed of an input hopper 1, an input roller 2, a card 3, a print head 4, a rod 5, a computer 6, drive rollers 7, star rollers 8, a flipping device 9, a card holding area 10, a fan 11, a flipper section 12, a first encoder 13, a second encoder 14, transport rollers 15, a supply roll 16, a take up roll 17, a laminate material 18, past rollers 19, pinch rollers 21 that face toward the transport rollers 15 respectively, a heater 22 and a platen 23. In the card printer shown in FIG. 15, the card 3 printed in a printing station is transferred to a laminating station allocated in the left part of the card printer through an intermediary station.

The card 3 is transferred through a gap between the transport roller 15 and the pinch roller 21 facing toward the transport roller 15 while the heater 22 is separated from the surface of the card 3, wherein the heater 22 includes an actuator (not shown). The laminate material 18 including a plurality of individual laminates carried on a web moves from the supply roll 16 to the take up roll 17 by way of the rollers 19 and the heater 22. Consequently, by taking up the laminate material 18 by the take up roll 17, a laminate provided on the laminate material 18 enables to be positioned in a laminating location on the card 3.

Further, the heater 22 presses the laminate material 18 on the printed surface of the card 3 by the assistance of the not-shown actuator included in the heater 22. Consequently, a laminating process is conducted on the printed surface of the card 3.

Furthermore, in the case of laminating a laminate on the other surface of the card 3, the card 3 is once returned to the intermediary station and flipped by the flipping device 9. Then the flipped card 3 is transported to the laminating station and the laminating process is conducted on the other surface of the card 3.

More, in case the laminating process is not conducted on the card 3, the heater 22 is separated from the surface of the card 3 by the assistance of the not-shown actuator included in the heater 22. When the heater 22 is separated from the card 3, the card 3 is transported by the transport roller 15 and the pinch roller 21 while the card 3 is sandwiched therebetween.

As mentioned above, a laminate film (laminate material) provided with a plurality of laminates is wound around a supply roll and a take up roll. The laminate film supplied from the supply roll is conducted to the thermal compression bonding process by a heater. Then a laminate is laminated on the surface of the card by taking up the laminate film by the take up roll. In other words, a laminate is peeled off from the laminate film that is taken up by the take up roll. It is preferable that an angle of peeling off the laminate from the laminate film is made to be enlarged when taking up the laminate film. In other words, in case a peeling-off angle of the laminate film is small, the laminate film to be taken up is almost in parallel with a card to be transported. Consequently, a laminate is hardly peeled off from the laminate film, and the laminate may remain on the laminate film in some cases.

Accordingly, in the card printer according to the prior art, there exists a problem such that the laminating process is not assuredly conducted on a card. In this regard, an angle of peeling off a laminate film is preferred to be enlarged. However, there exists another problem such that a peeling-off angle of the laminate film is hardly made to be enlarged because the laminate film may interfere with a transport roller or other members constituting a laminating station.

SUMMARY OF THE INVENTION

Accordingly, in consideration of the above-mentioned problems of the prior art, an object of the present invention is to provide a laminating apparatus for laminating a laminate material provided on a film onto a card comprising: a transporting means for transporting the card; a film supplying means for supplying the film so as to overlap the film with the card transported by the transporting means; a compression bonding means for thermally compression bonding the laminate material on the film overlapped with the card onto the card; a driving means for driving the compression bonding means to move from a standby location where the compression bonding means is separated from the film to a compression bonding location where the laminate material is thermally compression bonded on the card; a film taking-up means for taking up the film overlapped with the card; a first guiding means for guiding the film in a supply side of the film before the compression bonding means; a second guiding means for guiding the film in a take-up side of the film behind the compression bonding means; and a third guiding means for guiding the film in an upstream side of the second guiding means and in a downstream side of the compression bonding means, wherein the third guiding means moves in accordance with movement of the compression bonding means that is driven by the driving means.

According to another aspect of the present invention, there provided a laminating apparatus for laminating a laminate material provided on a film onto a card comprising: a transporting means for transporting the card; a film supplying means for supplying the film so as to overlap the film with the card transported by the transporting means; a compression bonding means for thermally compression bonding the laminate material on the film overlapped with the card onto the card; a driving means for driving the compression bonding means to approach or leave the card; a film taking-up means for taking up the film overlapped with the card; and a film mark sensing means for detecting a film mark provided on the film so as to position the laminate material, wherein the driving means drives the compression bonding means to move to a first location separated from a transporting path of the card when transporting the card, and wherein the driving means drives the compression bonding means to move to a second location close to the transporting path of the card more than the first location when detecting the film Mark by the film mark sensing means.

According to further aspect of the present invention, there provide a laminating method for laminating a laminate material provided on a film onto a card being transported, the laminating method comprising the steps of: shifting a compression bonding means for compression bonding the laminate material on the card to a standby location in which the compression bonding means is separated from the card; supplying the film from a film supplying means by way of a first guiding means so as to overlap the film with the card; moving the compression bonding means to a compression bonding location where the film overlapped with the card is compressed against the card; and taking up the film overlapped with the card by means of a film taking-up means by way of a second guiding means, wherein a third guiding means moves in accordance with movement of the compression bonding means in the step of moving the compression bonding means, and wherein the third guiding means contacts with the film within a space between the compression bonding means and the second guiding means in the step of taking up the film.

According to furthermore aspect of the present invention, there provided a laminating method for laminating a laminate material provided on a film onto a card being transported, the laminating method comprising the steps of: shifting a compression bonding means for compression bonding the laminate material on the card to a first location in which the compression bonding means is separated from the card; supplying the film so as to overlap the film with the card; moving the compression bonding means to a second location close to the card more than the first location; detecting a film mark provided on the film so as to position the laminate material while the compression bonding means is remained at the second location; shifting the compression bonding means from the second location to a third location where the film overlapped with the card is compressed against the card; and taking up the film overlapped with the card.

Other object and further features of the present invention will be apparent from the following detailed description when read in conjunction with the accompanying drawings.

DETAILED DESCRIPTION OF THE INVENTION

[First Embodiment]

With referring to FIGS. 1-14(b), a laminating apparatus and a printing apparatus according to a first embodiment of the present invention are described in detail.

Figure 1:
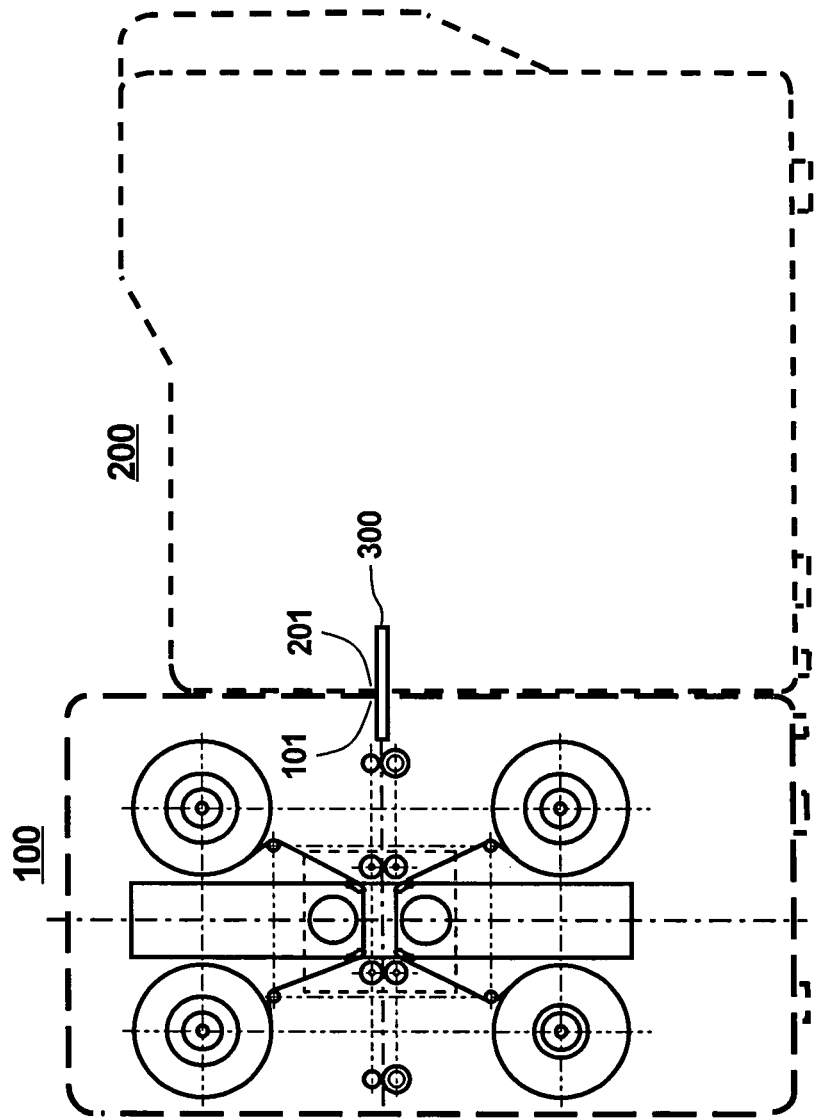
FIG. 1 is a plan view of a printing apparatus according to a first embodiment of the present invention showing an internal structure in outline.

Firstly, in reference to FIG. 1, a total configuration of a printing apparatus according to the first embodiment of the present invention is described.

FIG. 1 is a plan view of a printing apparatus incorporating a laminating apparatus according to the first embodiment of the present invention.

In FIG. 1, reference signs 100, 200 and 300 denote a laminating apparatus, a card printer and a card to be laminated respectively. In the card printer 200, a reference sign 201 denotes a card ejecting slot for the card 300 printed with information by the card printer 200. In the laminating apparatus 100, a reference sign 101 denotes a card intake slot, wherein the card 300 of which surface is printed by the card printer 200 is transported through the card ejecting slot 201 and inserted into the laminating apparatus through the card intake slot 101.

The card 300 is a plastic card such as a credit card and an identification (ID) card. It is acceptable for the card 300 to be provided with a magnetic stripe for storing magnetic data or to be embedded with a contactless type or contact type IC chip. In addition thereto, the card 300 is formed in a rectangular shape of which thickness is approximately 0.76 mm, for example.

The card printer 200 prints a predetermined character, figure or image on either one surface or both surfaces of the card 300. The card 300 printed by the card printer 200 is ejected through the card ejecting slot 201, wherein the card ejecting slot 201 is linked to the card intake slot 101 of the laminating apparatus 100 in series. As a result, the card 300 ejected from the card ejecting slot 201 of the card printer 200 is inserted into the card intake slot 101 of the laminating apparatus 100. Consequently, the card 300 to which a printing process is conducted is supplied to the laminating apparatus 100.

Further, the laminating apparatus 100 conducts a laminating process to the card 300 so as to protect a printed surface of the card 300.

In reference to FIG. 2, the laminating apparatus 100 is described in detail next.

Figure 2:
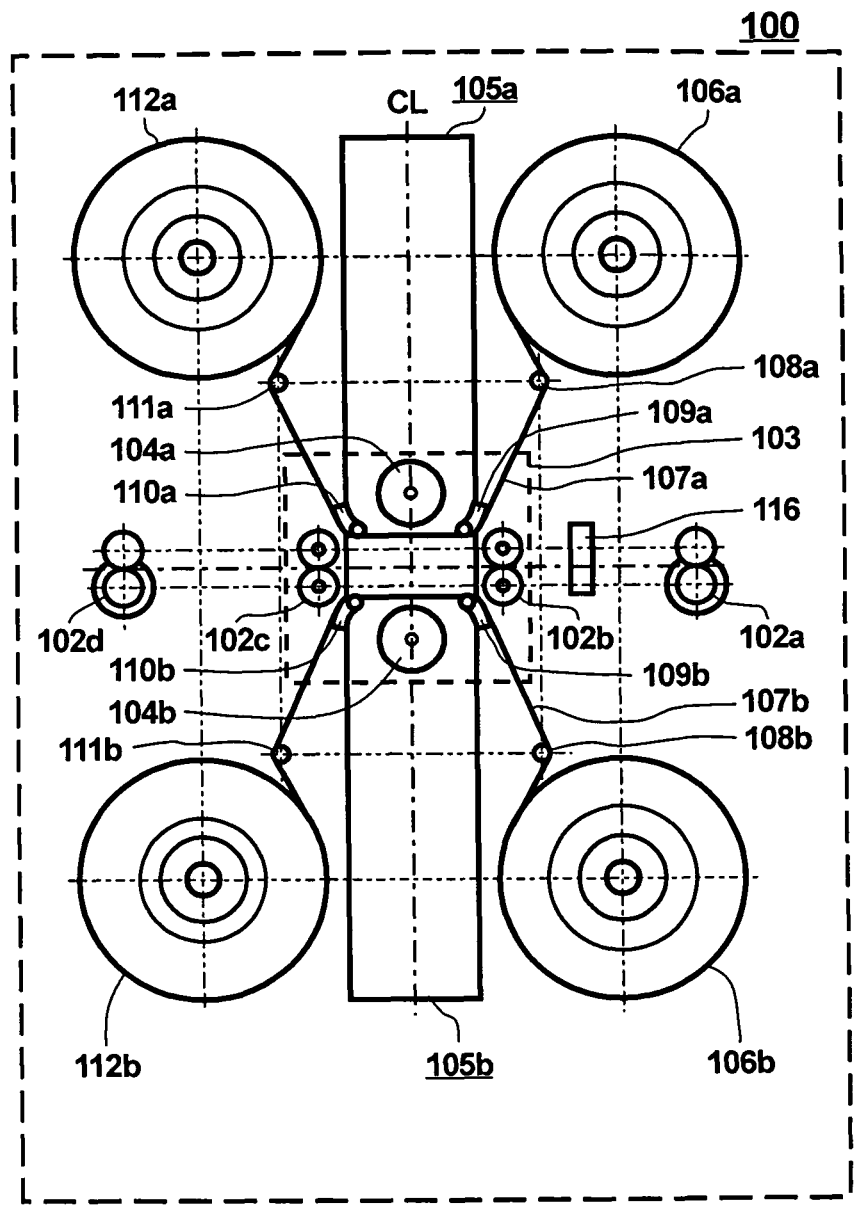
FIG. 2 is a plan view of a laminating apparatus shown in FIG. 1 exhibiting a major part of the laminating apparatus.

FIG. 2 is a plan view of the laminating apparatus 100 exhibited in a pattern diagram.

The laminating apparatus 100 according to the first embodiment of the present invention is such an apparatus that laminates on a surface of a card by overlapping a laminate film on the card as disclosed in the Japanese publication of unexamined patent applications No. 2006-256290 and No. 2007-276255, for example.

In FIG. 2, the laminating apparatus 100 is composed of transporting rollers 102a, 102b, 102c and 102d, a laminating stage 103, heat rollers 104a and 104b, upper and lower compression bonding mechanisms 105a and 105b, supply reels 106a and 106b, laminate films 107a and 107b, supply side guides 108a and 108b, fixed guides 109a, 109b, 110a and 110b, take-up side guides 111a and 111b, take up reels 112a and 112b, and a card sensor 116.

In FIG. 2, the card 300 to be laminated is transported from the right side to the left side, so that the right side is an upstream side in a card transporting direction and the left side is a downstream side in the card transporting direction.

Further, the laminating apparatus 100 according to the first embodiment of the present invention is a dual-sided laminating apparatus, which enables to laminate on both sides of the card 300 virtually simultaneously.

Furthermore, a mechanism for laminating on a bottom surface of the card 300 is configured to be almost a same mechanism as for laminating on a top surface of the card 300. Consequently, allocation of each component in a bottom half area in FIG. 2 is virtually mirror symmetrical with respect to those in an upper half area, so that some descriptions with respect to a symmetrical structure will be omitted hereafter.

The transporting rollers 102b and 102c are allocated in both upstream and downstream sides of the laminating stage 103 respectively. The transporting roller 102a is allocated in the upstream side of the transporting roller 102b, and the transporting roller 102d is allocated in the downstream side of the transporting roller 102c.

Further, the transporting roller 102a is composed of one pair of rollers that are vertically allocated at closely. By rotating either one of rollers or both rollers of the transporting roller 102a by means of a driving device such as a motor, the card 300 passes through the pair of rollers of the transporting roller 102a while sandwiched therebetween. In this connection, the card 300 is transported to the downstream side.

Furthermore, a distance between the transporting rollers 102a and 102b is made shorter than dimensions of the card 300, so that the card 300 carried out from the transporting roller 102a is transferred to the transporting roller 102b. Any one of the transporting rollers 102b, 102c and 102d is also composed of a pair of rollers. A distance between two transporting rollers lying next to each other is made shorter than the dimensions of the card 300, so that the card 300 is sequentially transferred from the transporting roller 102a finally to the transporting roller 102d. The transporting rollers 102a, 102b, 102c and 102d are almost horizontally aligned while keeping a predetermined distance among them.

Consequently, the card 300 is almost horizontally transported and the transporting roller 102d finally ejects the laminated card 300 from the laminating apparatus 100 externally.

More, the card sensor 116 is provided between the transporting roller 102a and the transporting roller 102b. The card sensor 116 is such a sensor as an optical sensor that is installed on a transporting path of the card 300 and detects the card 300 in contactless. In other words, the card 300 passes through the card sensor 116 when the card 300 is carried out from the transporting roller 102a.

When the card 300 is at a location of the card sensor 116, the card sensor 116 detects the card 300. By detecting whether or not the card 300 exists at the location of the card sensor 116, it is detected that the card 300 approaches the laminating stage 103 or the card 300 reaches the laminating stage 103.

More specifically, the card sensor 116 detects the card 300 when an end in the downstream side of the card 300 reaches the location of the card sensor 116. Consequently, it is recognized that the card 300 approaches the laminating stage 103.

Further, the card sensor 116 does not detect the card 300 any more when another end in the upstream side of the card 300 passes through the card sensor 116. Consequently, it is recognized that the card 300 reaches the laminating stage 103. For instance, when it is detected that the card 300 approaches the laminating stage 103, the laminate films 107a and 107b are positioned so as to prepare for a laminating process to be detailed later.

Furthermore, when it is detected that the card 300 reaches the laminating stage 103, the laminating process is conducted to the card 300 that is fed into the laminating stage 103. Operations of the laminating process will be detailed.

In addition, it is acceptable for the laminating apparatus 100 to provide a plurality of card sensors 116 at each detecting location of the card 300.

The transporting roller 102b is provided for transferring the card 300 to the laminating stage 103. The laminating process is conducted to the card 300 in the laminating stage 103 allocated between the transporting rollers 102b and 102c.

The heat roller 104a is allocated in an upper portion of the laminating stage 103 and the heat roller 104b is in a lower portion of the laminating stage 103.

Further, the heat rollers 104a and 104b are respectively allocated between the transporting rollers 102b and 102c in the card transporting direction. Each of the heat rollers 104a and 104b is a compression bonding device for thermally compression bonding a laminate material on the card 300.

Furthermore, each of the heat rollers 104a and 104b is installed so as to be able to move vertically. In other words, the heat rollers 104a and 104b are constructed so as to move vertically by the upper and lower compression bonding mechanisms 105a and 105b respectively. By such a construction of the upper and lower compression bonding mechanisms 105a and 105b, the heat rollers 104a and 104b approach or leave from the laminate films 107a and 107b respectively. In this case, the upper and lower compression bonding mechanisms 105a and 105b function as a driving mechanism for driving the heat rollers 104a and 104b to move vertically.

More, by the upper compression bonding mechanism 105a, the heat roller 104a approaches or leaves from the transporting path of the card 300. Similarly, by the lower compression bonding mechanism 105b, the heat roller 104b approaches or leaves from the transporting path of the card 300.

In addition, the heat roller 104a is allocated immediately above the heat roller 104b.

The supply reel 106a is allocated in the upstream side of the upper compression bonding mechanism 105a above the transporting rollers 102a and 102b. The laminate film 107a composed of a plurality of laminate materials is wound around the supply reel 106a. The laminate film 107a is extended from the supply reel 106a to the take up reel 112a through a space between the heat rollers 104a and 104b. The laminate film 107a is carried out from the supply reel 107a by rotating the take up reel 112a or both the supply reel 106a and the take up reel 112a by means of a driving device such as a motor.

Further, the laminate film 107a is sequentially guided by the supply side guide 108a, the fixed guides 109a and 110a and the take-up side guide 111a, and reaches the take up reel 112a. In other words, a location of the laminate film 107a is regulated by contacting with the supply-side guide 108a, the fixed guides 109a and 110a and the take-up side guide 111a respectively. The heat roller 104a depresses the laminate film 107a against the card 300 between the fixed guides 109a and 110a. By depressing the laminate film 107a against the cad 300, a laminate material provided on the laminate film 107a is thermally compression bonded on the top surface of the card 300 and transferred thereon.

In FIG. 2, a group of the supply reel 106a, the supply side guide 108a and the fixed guide 109a and another group of the take up reel 112a, the take-up side guide 111a and the fixed guide 110a are arranged in bilateral symmetry. In other words, a distance between the supply reel 106a and a card transporting surface is equivalent to a distance between the take up reel 112a and the card transporting surface.

Further, an intermediate point in the card transporting direction between the supply reel 106a and the take up reel 112a coincides with a center of the heat roller 104a. Consequently, the supply reel 106a and the take up reel 112a are arranged to be symmetrical with respect to a vertical line CL drawn through the center of the heat roller 104a in FIG. 2.

Similarly, the fixed guide 109a and the fixed guide 110a are arranged to be symmetrical with respect to the vertical line CL.

Further, the supply side guide 108a and the take-up side guide 111a are also arranged to be symmetrical with respect to the vertical line CL.

A laminating mechanism in the lower half of the laminating apparatus 100 is similarly configured to the above-mentioned laminating mechanism in the upper half of the laminating apparatus 100. Consequently, the supply reel 106b is allocated in the upstream side of the lower compression bonding mechanism 105b and the take up reel 112b is allocated in the downstream side of the lower compression bonding mechanism 105b. The laminate film 107b is extended from the supply reel 106b to the take up reel 112b through a space between the heat rollers 104a and 104b. The laminate film 107b is carried out from the supply reel 106b by rotating the take up reel 112b or both the supply reel 106b and the take up reel 112b by means of a driving device such as a motor.

Further, the laminate film 107b wound around the supply reel 106b in the lower half is sequentially guided by the supply side guide 108b, the fixed guides 109b and 110b and the take-up side guide 111b, and reaches the take up reel 112b. In other words, a location of the laminate film 107b is regulated by contacting with the supply side guide 108b, the fixed guides 109b and 110b and the take-up side guide 111b respectively. The heat roller 104b presses the laminate film 107b against the card 300 between the fixed guides 109b and 110b. By pressing the laminate film 107b against the card 300, a laminate material provided on the laminate film 107b is thermally compression bonded on the bottom surface of the card 300 and transferred thereon.

In FIG. 2, a group of the supply reel 106b, the supply side guide 108b and the fixed guide 109b and another group of the take up reel 112b, the take-up side guide 111b and the fixed guide 110b are arranged in bilateral symmetry. In other words, a distance between the supply reel 106b and the card transporting surface is equivalent to a distance between the take up reel 112b and the card transporting surface.

Further, an intermediate point in the card transporting direction between the supply reel 106b and the take up reel 112b coincides with the center of the heat roller 104b. Consequently, the supply reel 106b and the take up reel 112b are arranged to be symmetrical with respect to the vertical line CL drawn through the center of the heat roller 104b in FIG. 2.

Similarly, the fixed guide 109b and the fixed guide 110b are arranged to be symmetrical with respect to the vertical line CL and the supply side guide 108b and the take-up side guide 111b are also arranged to be symmetrical with respect to the vertical line CL.

In the laminating stage 103, as mentioned above, the laminate films 107a and 107b are overlapped with the card 300. In other words, the card 300 is sandwiched between the laminate films 107a and 107b.

Further, the heat rollers 104a and 104b compress the laminate films 107a and 107b against each surface of the card 300 respectively. By compressing the laminate films 107a and 107b against the card 300, a laminate material enables to be affixed on each surface of the card 300 and results in protecting both surfaces of the card 300.

Furthermore, in case of laminating a laminate material on only one surface of the card 300, either one of the laminate films 107a and 107b shall be removed from the supply reel and the take up reel. For instance, in case of laminating on the top surface of the card 300, the laminating process is conducted after the laminate film 107b in the lower half of the laminating apparatus 100 is removed.

On the other hand, in case of laminating on the bottom surface of the card 300, the laminating process is conducted after removing the laminate film 107a in the upper half.

Accordingly, the laminating apparatus 100 also enables to accommodate a single-side laminating process as mentioned above.

In addition, further guide members such as a movable guide and a fixed guide other than the fixed guides 109a, 109b, 110a and 110b are provided in the laminating stage 103 although they are not shown in FIG. 2. Those guide members regulate an angle of peeling off a laminate material from the laminate film. The guide members will be detailed later.

The heat rollers 104a and 104b are composed of an elastic body in a cylindrical shape formed from rubber or resin, for example, respectively.

Further, a heater such as halogen lamp heater is incorporated inside the heat rollers 104a and 104b respectively. The heater heats up respective outer peripheral surfaces of the heat rollers 104a and 104b to a predetermined temperature for thermal compression bonding. While the heat roller 104a maintains the predetermined temperature, the upper compression bonding mechanism 105a moves the heat roller 104a downward, and then the heat roller 104a compresses the laminate film 107a against the top surface of the card 300, and then a laminate material on the laminate film 107a is thermally compression bonded on the card 300.

Similarly, the lower compression bonding mechanism 105b moves the heat roller 104b upward, and then the heat roller 104b compresses the laminate film 107b against the bottom surface of the card 300. As a result, each laminate material provided on the laminate films 107a and 107b is thermally transferred to both surfaces of the card 300 respectively. Hereupon, a temperature for thermal compression bonding is arranged in accordance with a laminate material or a printing material such as print ink utilized in the card printer 200.

Furthermore, the heat rollers 104a and 104b are arranged so as to be rotatable with respect to a rotary shaft that is incorporated in the center of each heat roller and perpendicular to the plane of the page of FIG. 2. Consequently, the heat rollers 104a and 104b are driven to passively rotate by transporting force applied to the card 300 and carrying out force for the laminate films 107a and 107b. For instance, when the transporting roller 102b carries out the card 300 while the card 300 is sandwiched between the heat rollers 104a and 104b, the heat rollers 104a and 104b are driven to passively rotate by the transporting force applied to the card 300 by the transporting roller 102b.

More, taking-up force applied to the laminate films 107a and 107b by the take up reels 111a and 111b respectively assists the driving force to passively rotate the heat rollers 104a and 104b.

A first block composed of the supply reel 106a, the laminate film 107a, the supply side roller 108a, the fixed guides 109a and 110a, the take-up side guide 111a and the take up reel 112a and a second block composed of the supply reel 106b, the laminate film 107b, the supply side roller 108b, the fixed guides 109b and 110b, the take-up side guide 111b and the take up reel 112b are configured so as to be detachable from a main unit of the laminating apparatus 100.

More specifically, mounting the respective first and second blocks on a base member covering over a front side of the laminating apparatus 100 enables to configure a cassette unit that is removable from the main unit of the laminating apparatus 100. The cassette unit is removed from the laminating apparatus 100 when replacing the laminate film 107a or 107b, or removing the laminate film 107a or 107b from the laminating apparatus 100.

Accordingly, providing the cassette unit makes the replacing or removing the laminate film easier.

In reference to FIG. 3, a configuration of the laminate films 107a and 107b applied to the laminating apparatus 100 according to the first embodiment of the present invention is described in detail next.

The laminate films 107a and 107b are the same configuration, so that the laminate films 107a and 107b are hereinafter generically referred to as laminate film 107.

Figure 3:
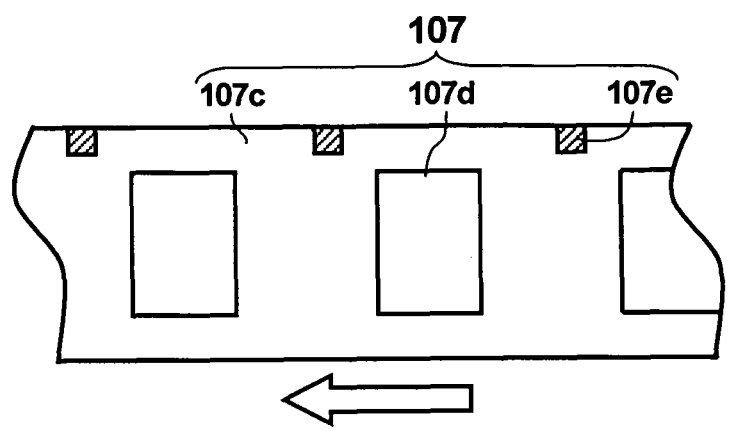
FIG. 3 is a plan view of a laminate film utilized in the laminating apparatus showing a configuration of the film.

FIG. 3 is a plan view of a laminate film 107 showing a configuration of the laminate film 107.

In FIG. 3, the laminate film 107 is composed of a carrier 107c, a plurality of patches 107d and a plurality of film marks 107e. The carrier 107c is a tape having predetermined length and width, and formed in a roll shape when installed in the supply reel 106a or 106b.

Further, the laminate film 107 is carried out in an arrow direction (hereinafter referred to as carrying-out direction) shown in FIG. 3 along the longitudinal direction of the laminate film 107. The plurality of patches 107d is affixed on the carrier 107c at predetermined intervals. The patch 107d or a laminate material is a transparent film, for example, and pre-cut in dimensions approximately the same size as the card 300. The laminate film 107 is extended from the supply reels 106a and 106b to the take up reels 112a and 112b respectively, wherein the patch 107d is arranged to face toward the card 300.

Furthermore, the film mark 107e is formed on the carrier 107c for the purpose of positioning the patch 107d. The film mark 107e is formed by dyeing the carrier 107c so as to shade light, for example. The film mark 107e is detected by a film mark sensor to be described later installed nearby a transporting path of the laminate film 107.

The film mark 107e is provided for each patch 107d. In other words, the patch 107d and the film mark 107e are allocated alternately, and an interval between the patch 107d and the film mark 107e that are adjoined to each other is approximately the same across the laminate film 107.

Further, detecting the film mark 107e enables to position a location of the patch 107d in the carrying-out direction of the laminate film 107. In other words, by the film mark 107e, a positional relationship between the patch 107 and a laminating position enables to be recognized.

Furthermore, by carrying out a predetermined amount of the laminate film 107 while one patch 107d is positioned in, the patch 107d is inserted into the laminating stage 103. In other words, the patch 107d moves into the space between the heat rollers 104a and 104b.

As mentioned above, the film mark 107e is detected so as to position the patch 107d on the laminate film 107.

Accordingly, by the above-mentioned positioning of a patch 107d, the patch 107d is thermally compression bonded on the card 300 in higher positional accuracy.

The patch 107d is formed in a rectangular shape in accordance with a shape of the card 300.

Further, each patch 107d is affixed on the carrier 107c, wherein a longitudinal direction of the patch 107 is aligned so as to be allocated along a width direction or lateral direction of the carrier 107c. In other words, the carrying-out direction of the laminate film 107 coincides with a lateral direction of the patch 107d. Consequently, arranging the patch 107d on the carrier 107c as mentioned above enables to provide more patches 107d on one roll of the carrier 107, and results in improving productivity.

Furthermore, the lateral direction of the card 300 results in coinciding with the transporting direction (right to left direction in FIG. 2) of the card 300. Arranging the card 300 as mentioned above enables to shorten a length of the card 300 in the transporting direction. Consequently, laminating time per one card 300 enables to be shortened. Shortening the laminating time per one card 300 enables to prevent the card 300 from excessive temperature rise, and results in suppressing a warp in the card 300. By suppressing the warp in the card 300, the card 300 enables to be prevented from interference with members adjoining to the transporting path of the card 300 during the card 300 is transported.

In addition thereto, it is also acceptable for the card 300 that a longitudinal direction of the card 300 is made to coincide with the card transporting direction, and then the card 300 is transported.

In reference to FIGS. 4(*a*) to 4(*c*), arrangement of guide members in the laminating stage 103 and a laminating process are described in detail next.

Figure 4A:
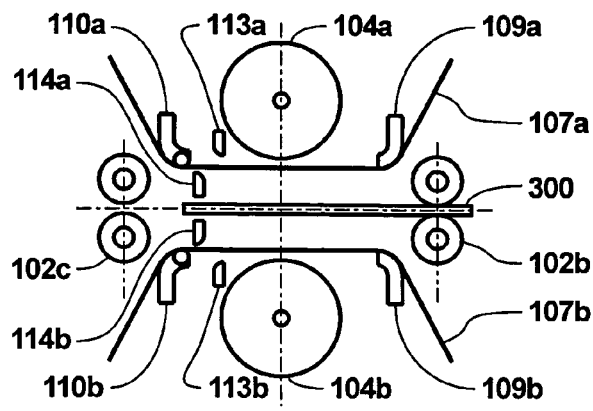
FIG. 4(a) is a partial plan view of the laminating apparatus shown in FIG. 2 exhibiting a first step of a laminating process.

FIG. 4(a) is a partial plan view of the laminating stage 103 exhibiting a first step of a laminating process.

Figure 4B:
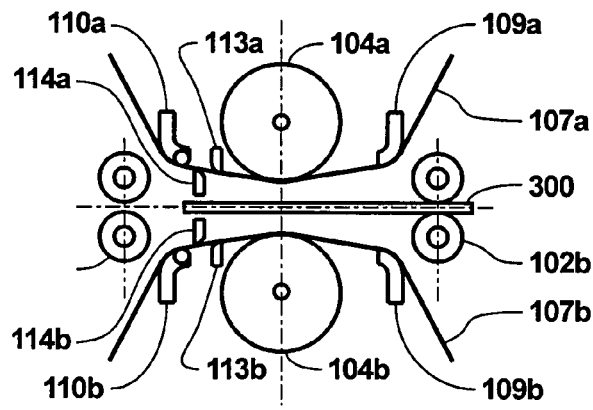
FIG. 4(b) is a partial plan view of the laminating apparatus shown in FIG. 2 exhibiting a second step of the laminating process.

FIG. 4(b) is a partial plan view of the laminating stage 103 exhibiting a second step of the laminating process.

Figure 4C:
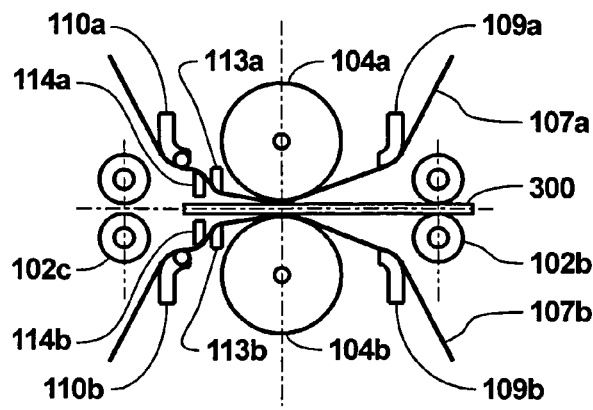
FIG. 4(c) is a partial plan view of the laminating apparatus shown in FIG. 2 exhibiting a third step of the laminating process.

FIG. 4(c) is a partial plan view of the laminating stage 103 exhibiting a third step of the laminating process.

In FIGS. 4(a)-4(c), reference signs 113a and 113b denote a movable guide respectively and reference signs 114a and 114b denote a fixed guide respectively.

Further, FIGS. 4(a)-4(c) exhibit positional relationship between the heat rollers 104a and 104b, wherein the heat rollers 104a and 104b are allocated in different locations in response to each step of the laminating process.

More specifically, in FIG. 4(a), the heat rollers 104a and 104b are maximally separated from each other. Consequently, FIG. 4(a) exhibits a standby condition for carrying out the laminate film 107.

Further, in FIG. 4(c), the heat rollers 104a and 104b approach each other maximally. Consequently, FIG. 4(c) exhibits a compression bonding condition for compressing the laminate film 107 against the card 300.

Furthermore, in FIG. 4(b), each location of the heat rollers 104a and 104b is an intermediate location with respect to the respective locations shown in FIGS. 4(a) and 4(c). Consequently, FIG. 4(b) exhibits a positioning condition for positioning the laminate film 107.

As shown in FIGS. 4(a)-4(c), the movable guides 113a and 113b are provided for the laminating apparatus 100 according to the first embodiment of the present invention.

The movable guides 113a and 113b move vertically together with the heat rollers 104a and 104b respectively in the same direction and the same distance as the heat rollers 104a and 104b move vertically. In other words, the movable guides 113a and 113b are raised or lowered by the upper and lower compression bonding mechanisms 105a and 105b together with the heat rollers 104a and 104b.

Further, the movable guides 113a and 113b are maximally separated from the card 300 during the standby condition exhibited in FIG. 4(a) and closely contacted with the card 300 during the compression bonding condition exhibited in FIG. 4(c).

Furthermore, in the positioning condition exhibited in FIG. 4(b), each distance of the movable guides 113a and 113b from the card 300 is an intermediate distance existing between two respective distances of the movable guides 113a and 113b from the card 300 exhibited in FIGS. 4(a) and 4(c).

More, the movable guides 113a and 113b are allocated in the downstream side of the heat rollers 104a and 104b respectively, and the fixed guides 114a and 114b are allocated in the downstream side of the movable guides 113a and 113b respectively. In other words, the fixed guides 114a and 114b are allocated in the upstream side of the fixed guides 110a and 110b respectively.

Moreover, the movable guide 113a is allocated above the laminate film 107a, and the fixed guide 114a is allocated under the laminate film 107a. Consequently, the movable guide 113a and the fixed guide 114a are allocated both of the upper and lower sides of the laminate film 107a respectively, and the laminate film 107a passes through a space between the movable guide 113a and the fixed guide 114a.

In addition, the movable guide 113a is allocated between the heat roller 104a and the fixed guide 114a in the transporting direction of the card 300. Consequently the movable guide 113a contacts with the laminate film 107a at a position immediately behind the heat roller 104a.

Similarly, the movable guide 113b is allocated below the laminate film 107b, and the fixed guide 114b is allocated above the laminate film 107b. Consequently, the movable guide 113b and the fixed guide 114b are allocated both of the lower and upper sides of the laminate film 107b respectively, and the laminate film 107b passes through a space between the movable guide 113b and the fixed guide 114b.

Further, the movable guide 113b is allocated between the heat roller 104b and the fixed guide 114b in the transporting direction of the card 300. Consequently the movable guide 113b contacts with the laminate film 107b at a position immediately behind the heat roller 104b.

The laminate film 107a that passes through the space between the heat rollers 104a and 104b is sequentially guided by the movable guide 113a, the fixed guide 114a and the fixed guide 110a in order.

Similarly, the laminate film 107b that passes through the space between the heat rollers 104a and 104b is sequentially guided by the movable guide 113b, the fixed guide 114b and the fixed guide 110b in order.

As mentioned above, the movable guides 113a and 113b and the fixed guides 114a and 114b are provided in a take up reel side adjacent to the laminating stage 103.

In case the card 300 is ejected from the laminating apparatus 100 without conducting the laminating process, that is, the card 300 ejected out from the card printer 200 is carried out from the laminating apparatus 100 without conducting the laminating process, the laminating apparatus 100 is maintained in the standby condition shown in FIG. 4(a). In FIG. 4(a), the heat rollers 104a and 104b are located in a first location or standby location where the heat rollers 104a and 104b are maximally separated from the card transporting path. Specifically, at the standby location, the heat rollers 104a and 104b are isolated from the transporting path of the card 300 by approximately 5 mm.

Further, the card 300 is transported by the transporting rollers 102a-102d without driving the heat rollers 104a and 104b to rotate while the heat rollers 104a and 104b are remained at the standby location.

Furthermore, the laminate films 107a and 107b are also isolated from the card transporting path maximally, so that the card 300 never interferes with the laminate films 107a and 107b even though a warped card 300 is transported. In other words, there exists enough clearance between the card 300 and the respective laminate films 107a and 107b, so that the card 300 never contacts with the laminate films 107a and 107b even though the card 300 is warped.

In addition, the movable guides 113a and 113b and the fixed guides 114a and 114b are isolated from the laminate films 107a and 107b respectively when the heat rollers 104a and 104b are located at the standby location.

On the other hand, in case of conducting the laminating process to the card 300, the heat rollers 107a and 107b are moved vertically in synchronism with each other.

Firstly, when positioning the laminate films 107a and 107b prior to conducting the laminating process, the heat rollers 104a and 104b are shifted from the standby location shown in FIG. 4(a) to a location shown in FIG. 4(b).

More specifically, the upper and lower compression bonding mechanisms 105a and 105b move the heat rollers 104a and 104b in the vertical direction respectively when the card 300 approaches the laminating stage 103. By the movement of the upper and lower compression bonding mechanisms 105a and 105b, the heat rollers 104a and 104b move from the standby location to a second location or positioning location shown in FIG. 4(b) at where the heat rollers 104a and 104b approach the card transporting path more closely. At the positioning location, the laminate films 107a and 107b are isolated from the transporting path of the card 300 by approximately 1.5 mm.

Secondly, after transportation of the card 300 is ceased, the film mark 107e on the carrier 107c is detected while the laminate films 107a and 107b are carried out. The film mark sensor to be detailed later detects the film mark 107e when the heat rollers 104a and 104b are at the positioning location as mentioned above.

Further, in the positioning condition, each of the movable guides 113a and 113b and the fixed guides 114a and 114b contacts with the laminate films 107a and 107b respectively. In other words, the movable guide 113a moves downward and depresses the laminate film 107a. By depressing the laminate film 107a, the laminate film 107a contacts with the fixed guide 114a, and then the laminate film 107a is guided by the movable guide 113a and the fixed guide 114a.

Similarly, the movable guide 113b moves upward and presses the laminate film 107b. By pressing the laminate film 107b upward, the laminate film 107b contacts with the fixed guide 114b, and then the laminate film 107b is guided by the movable guide 113b and the fixed guide 114b.

Further, the heat rollers 104a and 104b also contact with the laminate films 107a and 107b respectively. By positioning the laminate films 107a and 107b in the positioning condition, locations of the laminate films 107a and 107b are hardly misaligned until the patch 107d is compression bonded on the card 300.

As mentioned above, the laminate films 107a and 107b are provided with the film mark 107e that is printed on the carrier 107c at each patch 107d. By detecting the film mark 107e by the film mark sensor, the laminate films 107a and 107b are positioned in a right location prior to conducting the laminating process to the card 300.

Generally, the laminate film 107 is stopped at timing when the mark sensor detects the film mark 107e and conducted in the standby condition. In the standby condition, the patch 107d on the laminate film 107a is allocated right under the heat roller 104a, and the patch 107d on the laminate film 107b is allocated right above the heat roller 104b. In the first embodiment of the present invention, however, the laminate films 107a and 107b are not stopped at the timing when the mark sensor detects the film mark 107e, but the laminate films 107a and 107b are stopped to be slightly delayed in the timing because a location of the patch 107d on the laminate films 107a and 107b may vary.

Further, by adjusting an amount of delay, the laminating apparatus 100 is configured so as to be able to relatively adjust each location of the patch 107d on the laminate films 107a and 107b with respect to the card 300.

Furthermore, the laminating apparatus 100 is configured so as to be able to conduct such a delay adjustment to each of the laminate films 107a and 107b independently. By the independent delay adjustment, positional fluctuation of the patch 107d on the laminate films 107a and 107b enables to be absorbed even though a location of the patch 107d on the laminate films 107a and 107b varies by each laminate film 107. Such a positional adjustment enables to be operated by using an operating section, for example. A positional relationship between the patch 107d and the film mark 107e is almost the same in one roll of laminate film. Consequently, a location of the patch 107d on the laminate film 107 enables to be positioned more simply and accurately by adjusting an amount of delay at each one roll of the laminate film.

The thermal compression bonding process is conducted when the positioning of the laminate films 107a and 107b is completed. The card 300 is transported by the transporting rollers 102b and 102c for the thermal compression bonding. When the card sensor 116 detects that the card 300 reaches the laminating stage 103, the heat rollers 104a and 104b are moved vertically by the upper and lower compression bonding mechanisms 105a and 105b.

More specifically, the upper compression bonding mechanism 105a moves the heat roller 104a downward, and the lower compression bonding mechanism 105b moves the heat roller 104b upward. Consequently, the heat rollers 104a and 104b move vertically in synchronism with each other and sandwich the card 300 between them, and then compress the laminate films 107a and 107b against the card 300.

As shown in FIG. 4(c), the heat rollers 104a and 104b compress the laminate films 107a and 107b against the card 300. The locations of the heat rollers 104a and 104b compressing the card 300 is called as a third location or compression bonding location. Such a condition exhibiting the heat rollers 104a and 104b are at the compression bonding location is called as a compression bonding condition. In the compression bonding condition, the laminate film 107a is sandwiched between the top surface of the card 300 and the heat roller 104a, and the laminate film 107b is sandwiched between the bottom surface of the card 300 and the heat roller 104b.

In the compression bonding condition, the laminate films 107a and 107b are guided from the supply reels 106a and 106b by the supply side guides 108a and 108b respectively, and further guided by the fixed guides 109a and 109b respectively, and then compression bonded on the card 300 by the heat rollers 104a and 104b. After the laminate film 107a is compression bonded on the card 300, the laminate film 107a is sequentially guided by the movable guide 113a, the fixed guides 114a and 110a and the take-up side guide 111a, and then taken up by the take up reel 112a in accordance with transportation of the card 300. In this condition, the movable guide 113a lowers and presses the laminate film 107a downward furthermore.

Similarly, the laminate film 104b is sequentially guided by the movable guide 113b, the fixed guides 114b and 110b and the take-up side guide 111b, and then taken up by the take up reel 112b in accordance with transportation of the card 300. In this condition, the movable guide 113b rises and presses the laminate film 107a upward furthermore.

In this regard, when the compression bonding process is completed, the heat rollers 104a and 104b move vertically and return to the standby location or the standby condition shown in FIG. 4(a).

As mentioned above, locations of the heat rollers 104a and 104b sequentially transit to three conditions, that is, the standby condition, the positioning condition and the compression bonding condition.

Further, locations of the laminate films 107a and 107b in the positioning condition are closer to the transporting path of the card 300 more than their locations in the standby condition. By the above-mentioned locations of the laminate films 107a and 107b, an amount of vertical positional fluctuations of the laminate films 107a and 107b enables to be reduced while the positioning process is completed and the compression bonding process is conducted in succession. Reducing the amount of vertical positional fluctuations enables to reduce fluctuations of carrying-out amount of the laminate films 107a and 107b after the positioning process is completed. Consequently, positional accuracy enables to be improved.

More specifically, in case an amount of vertical positional fluctuations of the laminate films 107a and 107b is large, a carrying-out amount of the laminate films 107a and 107b after the positioning process is completed possibly fluctuates when the heat rollers 104a and 104b compress the laminate films 107a and 107b. In this case, the patch 107d may be laminated on a wrong location shifted from the right location to be compression bonded.

As mentioned above, in the laminating apparatus 100 according to the first embodiment of the present invention, the locations of the heat rollers 104a and 104b transit three conditions from the standby condition to the compression bonding condition through the above-mentioned positioning condition.

Accordingly, positioning accuracy enables to be greatly improved.

Further, in case a period of contacting the laminate films 107a and 107b with the heat rollers 104a and 104b is longer, the laminate films 107a and 107b are possibly deformed by heat and damaged. Consequently, it is preferable for the laminate films 107a and 107b to be immediately separated from the heat rollers 104a and 104b by returning the heat rollers 104a and 104b to the standby location after the compression bonding process is completed.

Furthermore, it is also acceptable for the laminate films 107a and 107b to be separated from the heat rollers 104a and 104b even in the positioning condition shown in FIG. 4(b). Separating the laminate films 107a and 107b from the heat rollers 104a and 104b enables to prevent the laminate films 107a and 107b from being deformed or damaged.

The laminating apparatus 100 according to the first embodiment of the present invention is provided with the upper and lower compression bonding mechanisms 105a and 105b. The upper and lower compression bonding mechanisms 105a and 105b isolate the heat rollers 104a and 104b from the card 300 and shift them to the standby location when transporting the card 300.

Further, the upper and lower compression bonding mechanisms 105a and 105b shift the heat rollers 104a and 104b to the positioning location that is closer to the card 300 than the standby location when positioning the patch 107d. Consequently, the upper and lower compression bonding mechanisms 105a and 105b enable to provide such a laminating apparatus that achieves a good balance between high-speed transportation of a card and accurate positioning of the card when laminating. For instance, in case of transporting the card 300 without conducting the laminating process, the heat rollers 104a and 104b are remained at the standby location.

More specifically, by stopping the operation of the upper and lower compression bonding mechanisms 105a and 105b while the heat rollers 104a and 104b are remained at the standby location, the laminate films 107a and 107b are separated from the surfaces of the card 300 widely. Then, the transporting rollers 102a-102d transport the card 300 while maintaining the standby condition. In this case, the card 300 never contacts with the laminate films 107a and 107b even though the card 300 is transported in a deformed shape. Particularly, in case the card 300 is transported in high-speed, the high-speed transportation of the card 300 may happen to increase a degree of deformation of the card 300. Consequently, in case of passing the card 300 through the laminating stage 103 without conducting the laminating process, high-speed transportation of the card 300 enables to be realized by remaining the heat rollers 104a and 104b at the standby location.

Further, the laminating apparatus 100 is provided with the movable guides 113a and 113b and the fixed guides 114a and 114b, so that an angle of peeling off the patch 107d from the laminate films 107a and 107b enables to be enlarged. Enlarging the peeling-off angle enables to suppress a defect in peeling off the patch 107d from the laminate film 107.

In reference to FIG. 5, suppressing the defect in peeling off the patch 107d is described in detail next.

Figure 5:
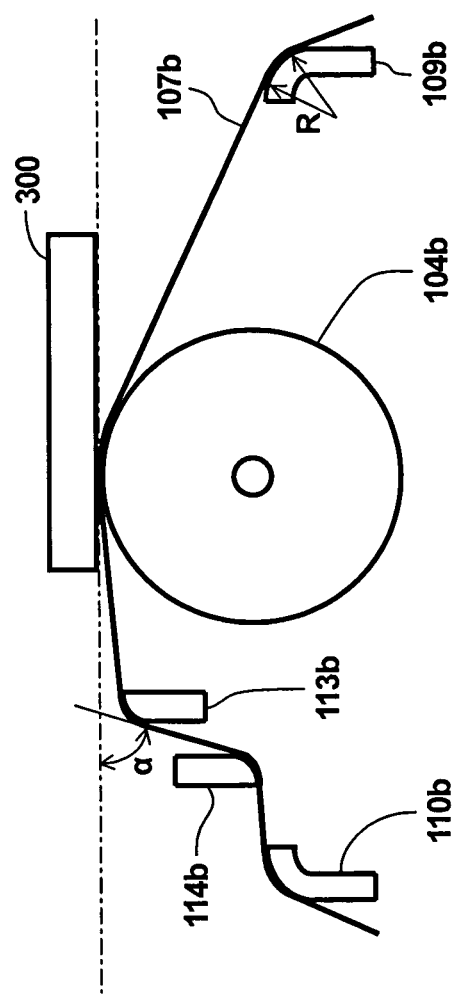
FIG. 5 is an enlarged plan view of a transporting section of the laminating apparatus shown in FIG. 4(c) exhibiting positional relationship among respective film guides provided in the lower half of the laminating apparatus.

FIG. 5 is a partially enlarged plan view of a transporting section of the laminating apparatus 100 in the compression bonding condition showing a configuration of the guide members provided under the transporting surface of the card 300.

Hereupon, a configuration of the guide members provided above the transporting surface of the card 300 is the same as that shown in FIG. 5 except for reference signs, so that description is omitted.

As shown in FIG. 5, the location of the laminate film 107b is regulated by the fixed guide 114b allocated above the laminate film 107b. The fixed guide 114b contacts with the top surface of the laminate film 107b, so that the laminate film 107b passes under the fixed guide 114b. Consequently, by the above-mentioned configuration of the fixed guide 114b, the laminate film 107b goes obliquely downward as shown in FIG. 5.

Further, the movable guide 113b allocated under the laminate film 107b rises, so that the movable guide 113b also regulates the vertical location of the laminate film 107b. In other words, the movable guide 113b presses the laminate film 107b upward from the bottom side of the laminate film 107b.

As mentioned above, the movable guide 113b presses the laminate film 107b upward and the fixed guide 114b presses the laminate film 107b downward. In this regard, as shown in FIG. 5, an angle α between the laminate film 107b and the transporting surface of the card 300 becomes larger. In other words, the reactions of the movable guide 113b and the fixed guide 114b make the peeling-off angle α of the laminate film 107b larger. In the compression bonding condition, the movable guide 113b drives the laminate film 107b to move upward while the laminate film 107b winds around the fixed guide 114b. In this regard, the peeling-off angle α enables to be enlarged. Consequently, the enlarged peeling-off angle α enables to prevent the laminate film 107b from being transported without peeling off the patch 107d from the carrier 107c.

Accordingly, enlarging the peeling-off angle α enables to suppress the defect in peeling off the patch 107d from the laminate film 107b, and resulting in being able to laminate the patch 107d on the card 300 securely.

In the first embodiment of the present invention, the peeling-off angle α or the angle between the surface of the card 300 and the laminate film 107b is set to 60 degrees. According to physical experiments of the inventors of the present invention, it is confirmed that enlarging the peeling-off angle α at a guide in the taking-up side of the laminate film 107b enables to peel off the patch 107d from the carrier 107c securely when the patch 107d is peeled off from the carrier 107c of the laminate film 107b after the laminating process is completed. In this regard, the peeling-off angle α is enlarged, so that the patch 107d is apt to easily rise from the carrier 107c of the laminate film 107b, and resulting in accelerating the peeling-off of the patch 107d.

Accordingly, by setting the peeling-off angle α to 60 degrees or more, peeling off the patch 107d from the carrier 107c is securely performed.

Further, it is more preferable that the peeling-off angle α approximates to 90 degrees.

As mentioned above, it is preferable for the peeling-off angle α to be set to a range of 60 to 90 degrees. By setting the peeling-off angle α to the range, the patch 107d after the laminating process is completed enables to be securely peeled off from the carrier 107c.

In addition, setting the peeling-off angle α to the range enables to securely peel off the patch 107d from the carrier 107c even though the laminate film 107b is different in a compression bonding specification or material. Consequently, secure peeling-off enables to be applied for various kinds of laminate films.

Accordingly, it is not necessary that various kinds of cassette units in which positional configuration of each guide varies, are utilized for coping with various laminate films, and resulting in reducing a cost of component parts.

Further, it is preferable for a radius of the fixed guide 109b in the supply side to be extended. In order to extend the radius, a surface of the fixed guide 109b contacting with the laminate film 107b should be formed in a smoothly curved surface. In the first embodiment of the present invention, as shown in FIG. 5, a curvature radius "R" of a surface contacting with the laminate film 107b (hereinafter referred to as contacting surface) of the fixed guide 109b is enlarged.

Furthermore, in the supply side, it is essential for the patch 107d to be securely affixed on the carrier 107c without peeled off. In case the curvature radius "R" of the fixed guide 109b is small, the patch 107d easily rises at the curved surface or contacting surface of the fixed guide 109b and results in being possibly peeled off. However, in case the fixed guide 109b is composed of a cylinder or a roller, such a configuration of the fixed guide 109b obstructs internal allocations of the laminating apparatus 100 and results in making it difficult for downsizing the apparatus.

More, in case of the first embodiment of the present invention, the fixed guide 109b is composed of molded resin and the curvature radius "R" of a guiding surface or the contacting surface for the laminate film 107b is designated to be 5 mm. It is preferable for the curvature radius "R" of the contacting surface of the fixed guide 109b to be 5 mm or more.

Accordingly, by designating the curvature radius "R" to be 5 mm or more, the patch 107d is prevented from accidental peeling off prior to conducting the laminating process.

Further, by forming the fixed guide 109b in an asymmetrical shape other than a symmetrical shape such as a cylinder and a roller, the laminating apparatus 100 enables to be miniaturized.

Transporting the card 300 in the laminating stage 103 is conducted by the transporting rollers 102b and 102c allocated in the upstream side and the downstream side of the laminating stage 103 respectively. In some cases, the heat rollers 104a and 104b increase load to transportation of the card 300 depending on a laminate material. Particularly, in case the heat rollers 104a and 104b compress both surfaces of the card 300 respectively as disclosed in the first embodiment according to the present invention, the heat rollers 104a and 104b compress the laminate films 107a and 107b against the card 300 respectively, and resulting in relatively increasing the load to the transportation of the card 300 more.

On the other hand, winding force applied for taking up the laminate films 107a and 107b assists in transporting the card 300. Consequently, according to the first embodiment of the present invention, the take up reels 112a and 112b are driven by higher winding force in such a way that tension at the laminate films 107a and 107b caused by the take up reels 112a and 112b is set to be enough tension for assisting the transportation of the card 300, for example, to be 5 to 10 N.

In case of conducting the laminating process on merely one surface of the card 300 by utilizing the laminating apparatus 100 according to the first embodiment of the present invention, the heat rollers 104a and 104b compress the card 300 from the upside and the downside in the vertical direction, and results in load to the transportation of the card 300. However, just one laminate film is taken up, so that force for assisting the card transportation decreases. Consequently, in case of conducting the laminating process on merely one surface of the card 300, it is more suitable for the take up reel to be driven by higher taking-up force that is much higher than the force to be applied for the case of conducting the laminating process on both surfaces of the card 300.

More specifically, in case of laminating on one surface of the card 300, it is preferable to control taking-up force to be applied to the laminate film so as to be much higher than taking-up force applied for the case of laminating on both surfaces of the card 300. Such taking-up force to the take up reel enables to be controlled by force such as torque of a take up motor that drives the take up reel to rotate.

Accordingly, the taking-up force enables to be optimized.

In reference to FIGS. 6-11, a configuration and operations of the lower compression bonding mechanism 105b are described in detail next.

Figure 6:
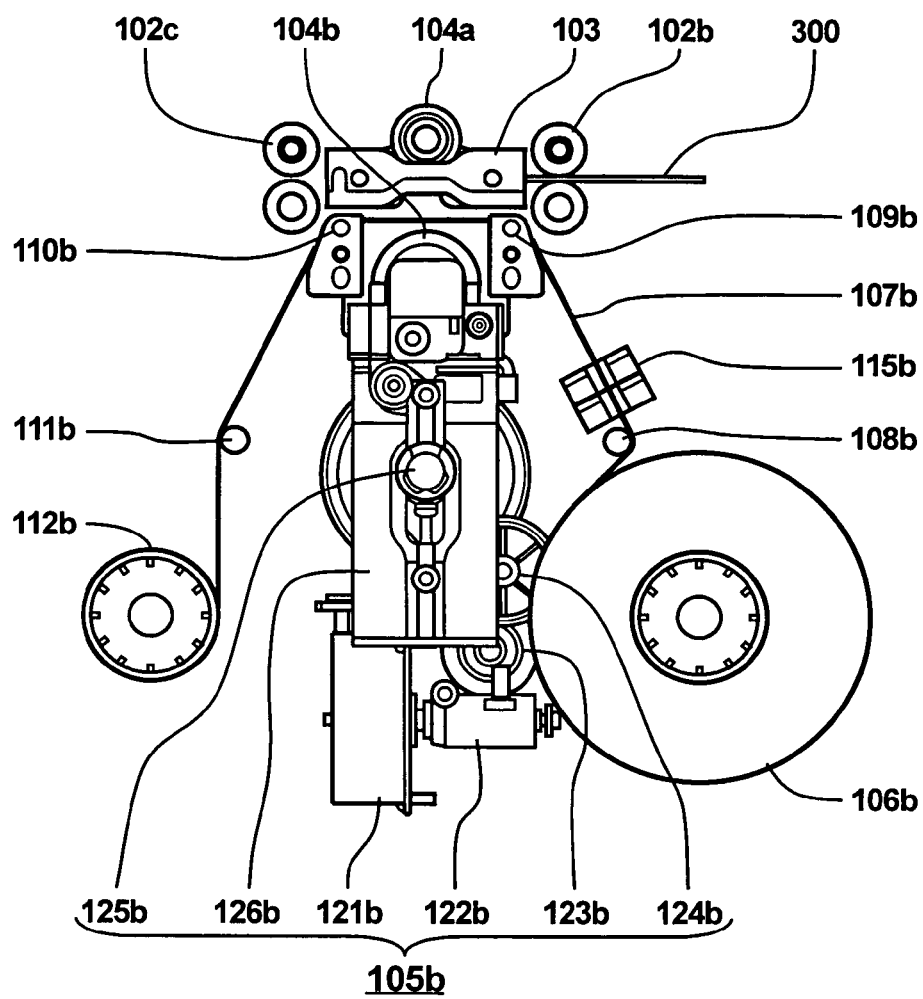
FIG. 6 is a partially detailed plan view of the laminating apparatus showing a structure of the laminating apparatus in a standby condition or the first step of the laminating process.

FIG. 6 is an enlarged plan view of the lower compression bonding mechanism 105b and surrounding members in the standby condition.

Figure 7:
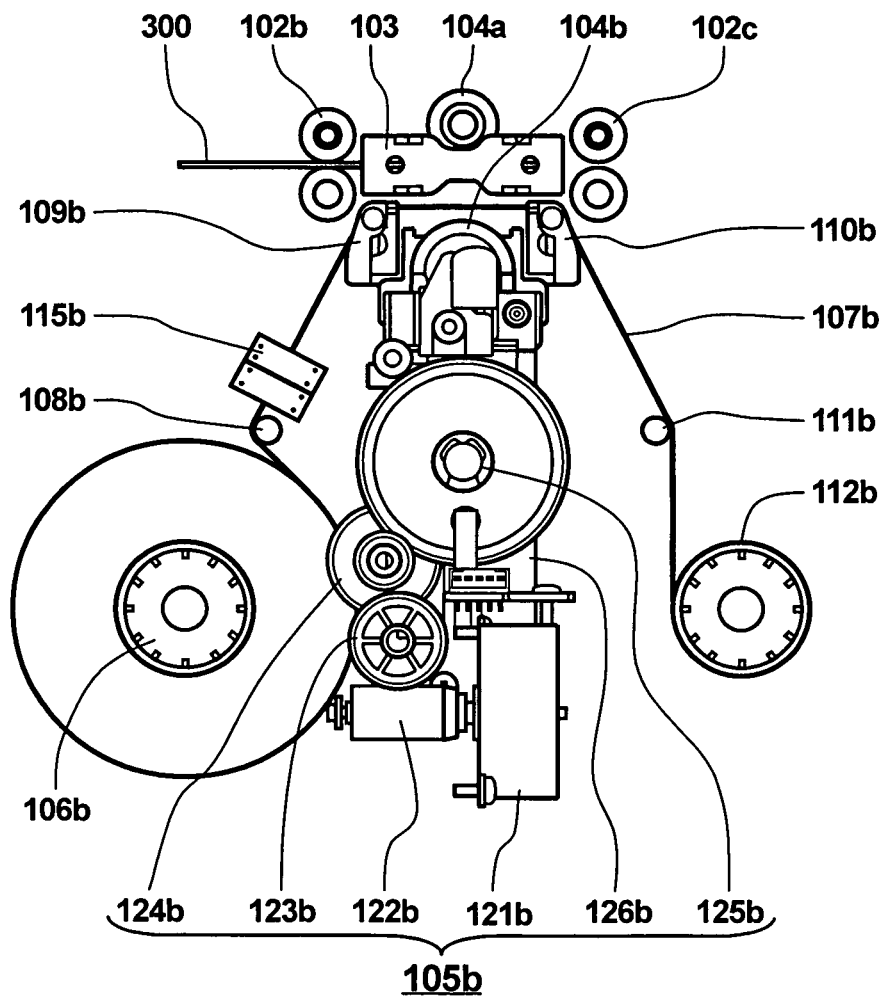
FIG. 7 is a bottom view of the laminating apparatus shown in FIG. 6 exhibiting a structure of the laminating apparatus in the standby condition.

FIG. 7 is a bottom view of the lower compression bonding mechanism 105b and the surrounding members shown in FIG. 6.

Figure 8:
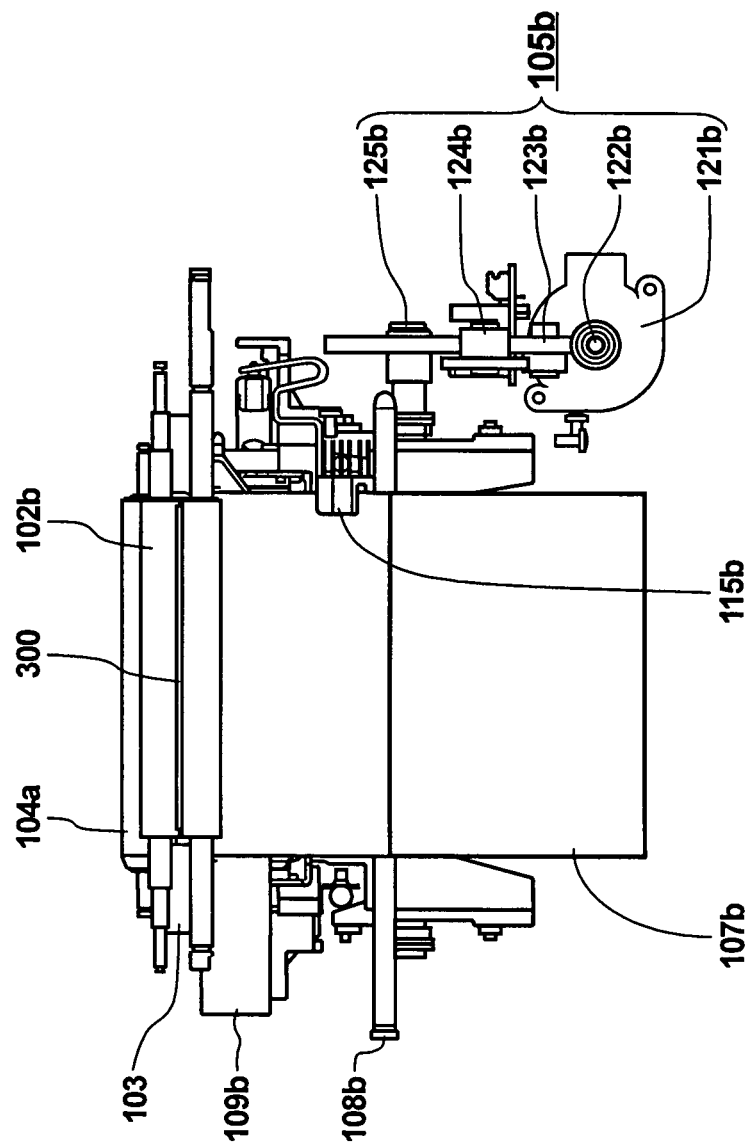
FIG. 8 is a partially detailed right side view of the laminating apparatus shown in FIG. 6 exhibiting a structure of the laminating apparatus in the standby condition.

FIG. 8 is a right side view of the lower compression bonding mechanism 105b and the surrounding members shown in FIG. 6 viewing from the upstream side of the lower compression bonding mechanism 105b.

Figure 9:
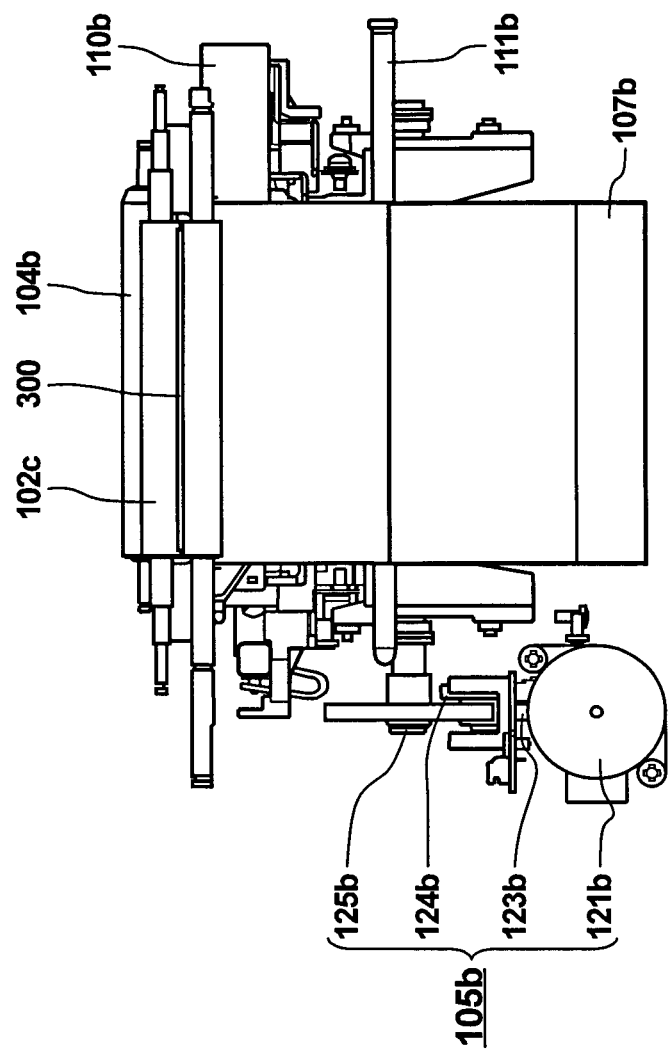
FIG. 9 is a partially detailed left side view of the laminating apparatus shown in FIG. 6 exhibiting a structure of the laminating apparatus in the standby condition.

FIG. 9 is a left side view of the lower compression bonding mechanism 105b and the surrounding members shown in FIG. 6 viewing from the downstream side of the lower compression bonding mechanism 105b.

Figure 10:
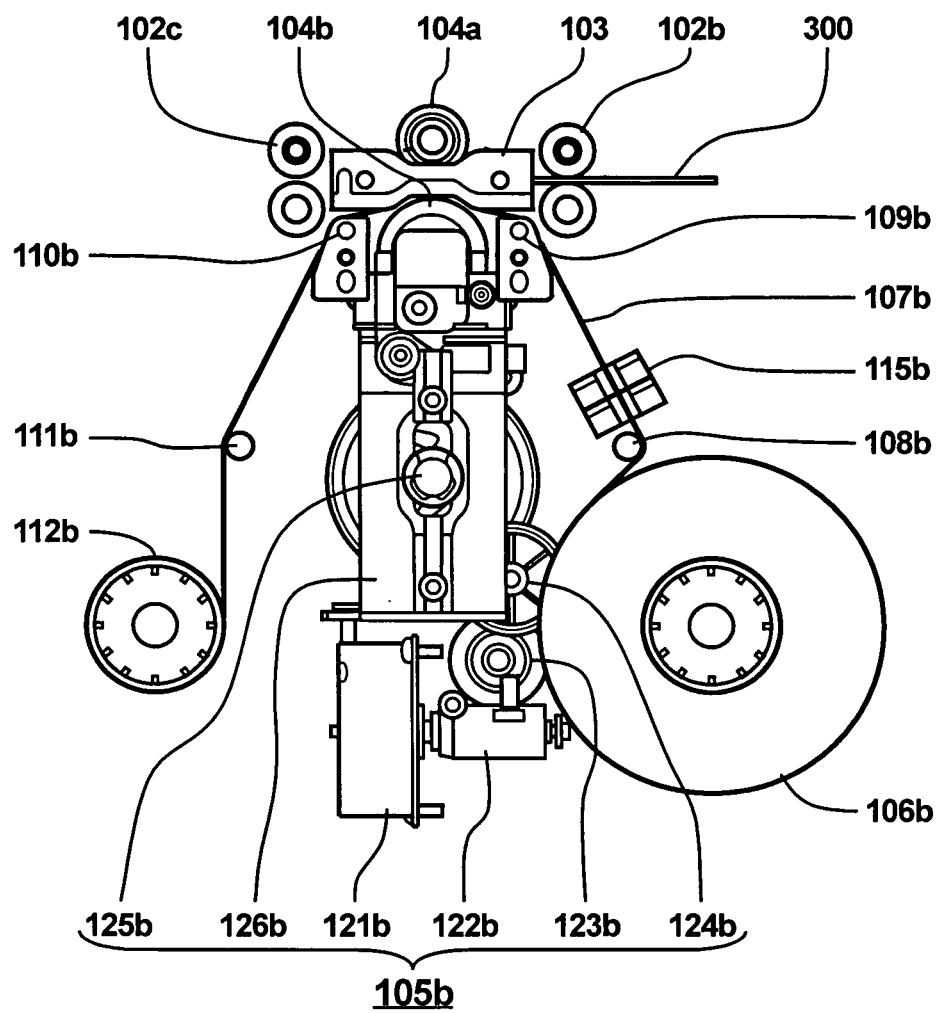
FIG. 10 is a partially detailed plan view of the laminating apparatus showing a structure of the laminating apparatus in a positioning condition or the second step of the laminating process.

FIG. 10 is an enlarged plan view of the lower compression bonding mechanism 105b and the surrounding members in the positioning condition.

Figure 11:
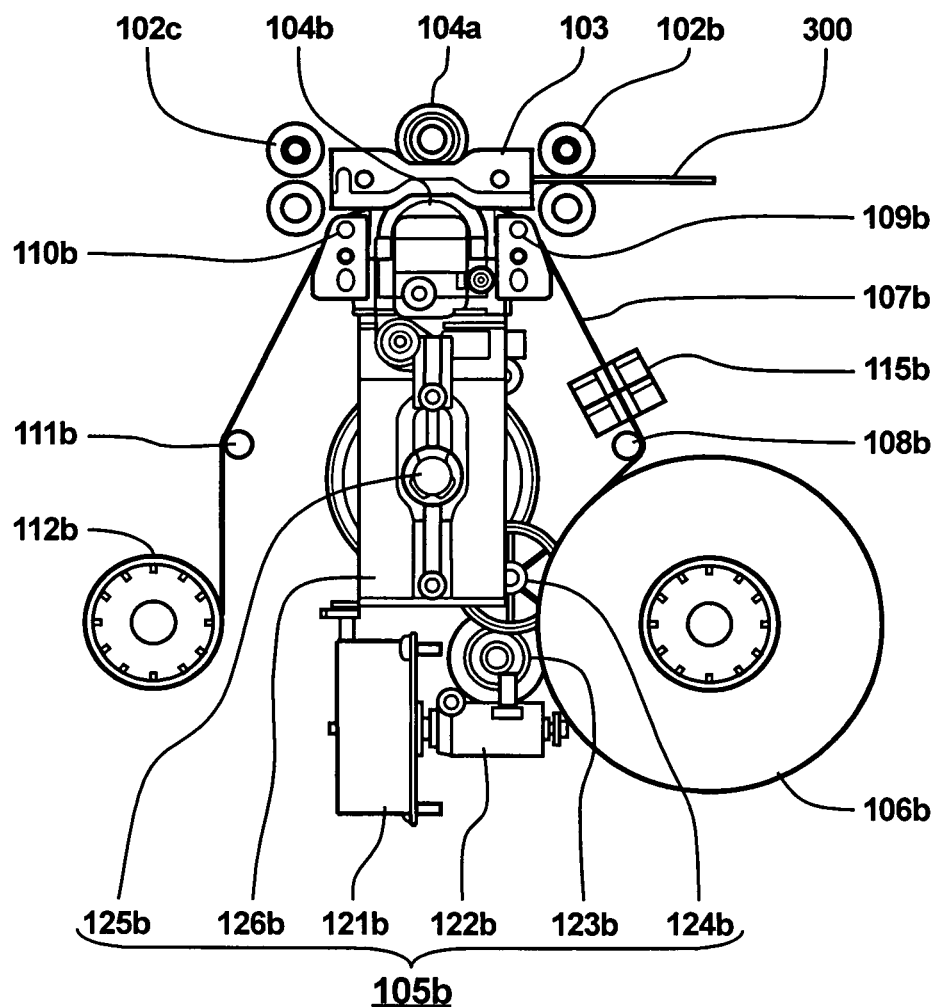
FIG. 11 is a partially detailed plan view of the laminating apparatus showing a structure of the laminating apparatus in a compression bonding condition or the third step of the laminating process.

FIG. 11 is an enlarged plan view of the lower compression bonding mechanism 105b and the surrounding members in the compression bonding condition.

Hereupon, a configuration and operations of the upper compression bonding mechanism 105a are similar to those of the lower compression bonding mechanism 105b except for reference signs, so that figures and descriptions for the upper compression bonding mechanism 105a are omitted.

In FIG. 6, the lower compression bonding mechanism 105b is composed of a driving motor 121b, a worm 122b, a first decelerator 123b, a second decelerator 124b, a lower cam section 125b and a case 126b.

Further, as shown in FIG. 6, a film mark sensor 115b is provided in the transporting path of the laminate film 107b. The film mark sensor 115b detects the film mark 107e on the carrier 107c of the laminate film 107b.

Furthermore, the film mark sensor 115b is an optical sensor, for example, and detects the film mark 107e without contacting with the laminate film 107b.

The driving motor 121b powers the heat roller 104b so as to move vertically upward and downward. In other word, by the power of the driving motor 121b, the heat roller 104b approaches or separates from the card 300. The power of the driving motor 121b is transmitted to the worm 122b.

Further, the worm 122b engages with the first decelerator 123b, and the first decelerator 123b further engages with the second decelerator 124b, and then the second decelerator 124b engages with a gear of the lower cam section 125b. Consequently, the power of the driving motor 121b is transmitted to the lower cam section 125*b* by way of the worm 122*b*, the first decelerator 123*b*, and the second decelerator 124*b* in order.

The lower cam section 125*b* is composed of some members such as a gear that engages with the second decelerator 124*b* and is supported by the case 126*b* so as to be rotatable freely. Consequently, when the power of the driving motor 121*b* is transmitted to the lower cam section 125*b*, an eccentric cam (not shown in FIGS. 6-11) incorporated in the lower cam section 125*b* rotates. In this regard, the lower cam section 125*b* converts rotational motion into linear reciprocal motion. The lower cam section 125*b* drives the heat roller 104*b* to move upward, and then the heat roller 104*b* rises.

In case of shifting a condition of the laminating stage 103 from the standby condition to the positioning condition, for example, the heat roller 104*b* rises. In the positioning condition, as shown in FIG. 10, the heat roller 104*b* approaches the card 300.

Further, in case of shifting a condition of the laminating stage 103 from the positioning condition to the compression bonding condition, as shown in FIG. 11, the heat roller 104*b* rises more and compresses the laminate film 107*b* against the bottom surface of the card 300 in the laminating stage 103. By compressing the laminate film 107*b* against the card 300, the patch 107*d* is compression bonded on the bottom surface of the card 300. When the patch 107*d* is compression bonded on the card 300, the card 300 is transported by the transporting rollers 102*b* and 102*c* to the downstream side. At the same time, driving force is applied to the take up reel 112*b* and results in initiating the laminate film 107*b* to be taken up. In case of rotating the take up reel 112*b* in synchronism with the transporting rollers 102*b* and 102*c*, for example, the patch 107*d* is compressed against the card 300 by the heat roller 104*b*, and then transferred thereon. In the laminating apparatus 100 according to the first embodiment of the present invention, a transporting speed of the laminate film 107*b* is coincided with a carrying speed of the card 300.

Furthermore, when the compression bonding process is completed, the heat roller 104*b* lowers and the lower compression bonding mechanism 105*b* returns to the standby condition shown in FIG. 6 from the compression bonding condition shown in FIG. 11.

In the laminating apparatus 100 according to the first embodiment of the present invention, the driving motor 121*b* is a stepping motor or a pulse motor. In this regard, an elevating amount of the heat roller 104*b* is controlled by a number of pulses to be supplied to the driving motor 121*b*.

More specifically, in case the laminating stage 103 transits to each of the three conditions in order, inputting a predetermined number of pulses into the driving motor 121*b* controls a rotational amount of the driving motor 121*b*. Consequently, the elevating amount of the heat roller 104*b* enables to be controlled by the number of pulses.

Further, the heat roller 104*b* returns to the standby condition whenever the compression bonding process is completed.

In reference to FIGS. 12(*a*)-14(*b*), configurations of the lower cam section 125*b* incorporated in the lower compression bonding mechanism 105*b* and its neighboring area are described in detail next.

FIG. 12(*a*) is a pattern diagram of the lower cam section 125*b* and its neighboring area in the standby condition.

FIG. 12(*b*) is a partial diagrammatic illustration of the lower cam section 125*b* shown in FIG. 12(*a*) viewing from right side of the lower cam section 125*b*.

Figure 13A:
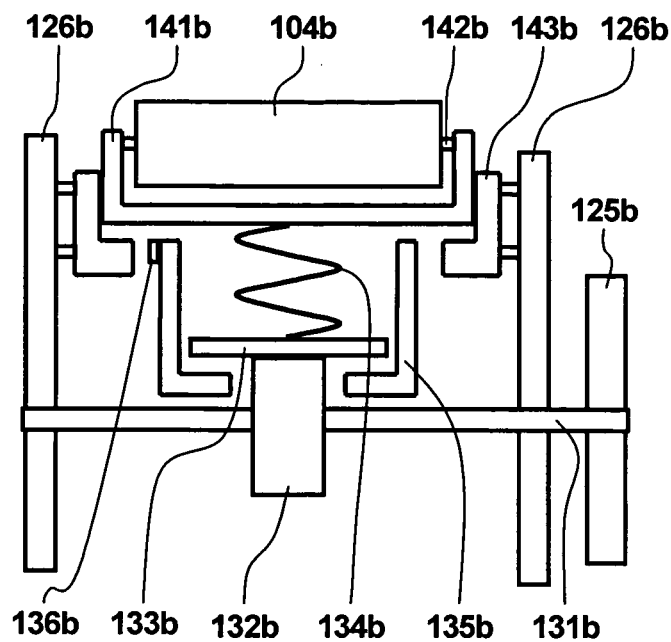
FIG. 13(a) is a pattern diagram of the lower cam section in the positioning condition viewing from the left side of the laminating apparatus shown in FIG. 10.
Figure 13B:
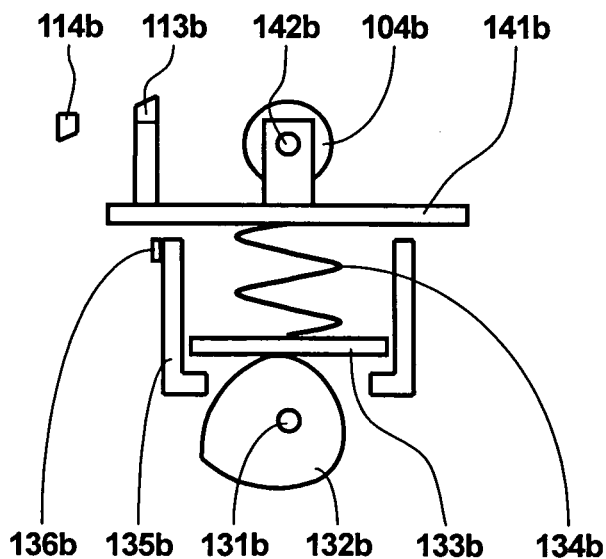
FIG. 13(b) is a partial pattern diagram of the lower cam section in the positioning condition viewing from the right side of the lower cam section in FIG. 13(a).

FIG. 13(*a*) is a pattern diagram of the lower cam section 125*b* and its neighboring area in the positioning condition.

FIG. 13(*b*) is a partial diagrammatic illustration of the lower cam section 125*b* shown in FIG. 13(*a*) viewing from right side of the lower cam section 125*b*.

FIG. 14(*a*) is a pattern diagram of the lower cam section 125*b* and its neighboring area in the compression bonding condition.

FIG. 14(*b*) is a partial diagrammatic illustration of the lower cam section 125*b* shown in FIG. 14(*a*) viewing from right side of the lower cam section 125*b*.

As shown in FIGS. 12(*a*) and 12(*b*), the lower cam section 125*b* is composed of a shaft 131*b*, an eccentric cam 132*b*, a plate 133*b*, a compression spring 134*b*, a linear guide 135*b* and a roller-position sensor 136*b*.

Further, the heat roller 104*b* is supported by a roller holder 141*b* by means of a roller shaft 142*b* so as to be rotatable freely. Consequently, the heat roller 104*b* rotates with respect to the roller shaft 142*b* as a center of rotation.

Furthermore, the roller holder 141*b* incorporating the roller shaft 142*b* is mounted on a holder guide 143*b*.

More, the movable guide 113*b* and the fixed guide 114*b* are provided nearby the heat roller 104*b*.

In addition, the roller-position sensor 136*b* is provided under the roller holder 141*b* so as to detect a vertical location of the heat roller 104*b*.

The shaft 131*b* is installed in the case 126*b* so as to be rotatable freely with respect to the case 126*b*. The shaft 131*b* is linked to the cam section 125*b* and mounted with the eccentric cam 132*b*. Consequently, the shaft 131*b* is rotated by the power of the driving motor 121*b* transmitted through the worm 122*b*, the first and second decelerators 123*b* and 124*b* and the cam section 125*b*. In this regard, the eccentric cam 132*b* rotates by the rotation of the shaft 131*b*. As shown in FIG. 12(*b*), the eccentric cam 132*b* is eccentric with respect to the shaft 131*b*. Therefore, as shown in FIGS. 12(*b*), 13(*b*) and 14(*b*), a location of an upper end of the eccentric cam 132*b* contacting with the plate 133*b* with respect to the shaft 131*b* varies in accordance with rotation of the eccentric cam 132*b*.

Further, the plate 133*b* is mounted above the eccentric cam 132*b*, so that the plate 133*b* is raised by the eccentric cam 132*b* that pushes the plate 133*b* upward.

Furthermore, the plate 133*b* is built in the linear guide 135*b*. The linear guide 135*b* guides the plate 133*b* to move vertically. Consequently, the plate 133*b* moves vertically while sliding along the linear guide 135*b* in accordance with a rotational angle of the eccentric cam 132*b*.

The compression spring 134*b* is installed above the plate 133*b*, and linked to the roller holder 141*b*.

More specifically, one end of the compression spring 134*b* as an elastic body is linked to the plate 133*b* and the other end is linked to the roller holder 141*b*. A distance between the roller holder 141*b* and the plate 133*b* varies by a degree of expansion and contraction of the compression spring 134*b*. When the eccentric cam 132*b* pushes the plate 133*b* upward, the compression spring 134*b* shrinks in length. The shrunk compression spring 134*b* presses the roller holder 141*b* upward. In this regard, the roller holder 141*b* rises from the holder guide 143*b*, and the heat roller 104*b* moves from the standby location shown in FIGS. 12(*a*) and 12(*b*) to the positioning location shown in FIGS. 13(*a*) and 13(*b*). Consequently, the lower cam section 125*b* transits from the standby condition to the positioning condition.

The more the eccentric cam 132*b* is rotated, the more the plate 133*b* moves upward. In response to the upward movement of the plate 133*b*, the roller holder 141*b* also moves upward and the lower cam section 125*b* transits from the positioning condition shown in FIGS. 13(*a*) and 13(*b*) to the compression bonding condition shown in FIGS. 14(a) and 14(b). In the compression bonding condition, the heat roller 104b is allocated at an uppermost location.

Figure 12A:
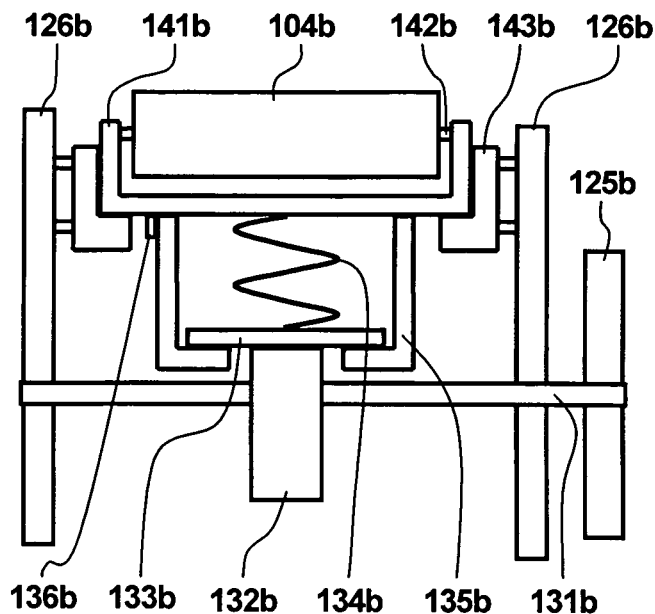
FIG. 12(a) is a pattern diagram of a lower cam section constituting the laminating apparatus in the standby condition viewing from the left side of the laminating apparatus shown in FIG. 6.
Figure 12B:
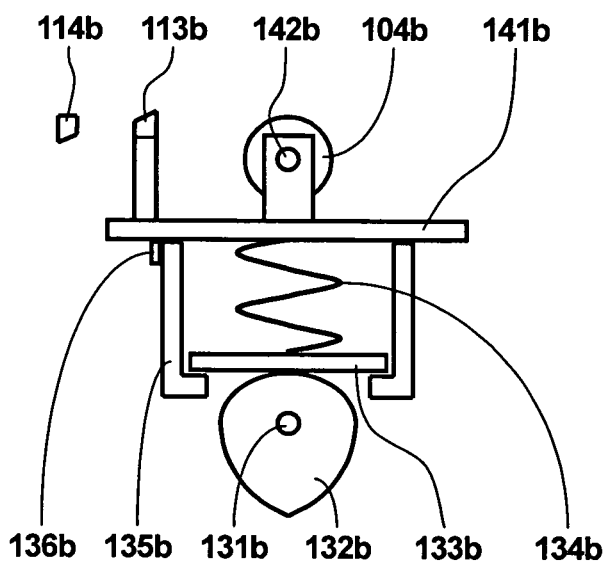
FIG. 12(b) is a partial pattern diagram of the lower cam section in the standby condition viewing from the right side of the lower cam section in FIG. 12(a).
Figure 14A:
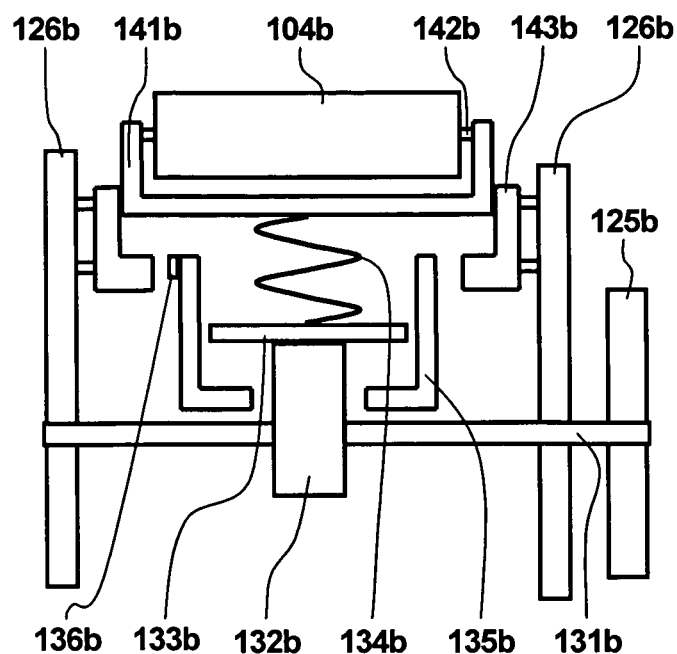
FIG. 14(a) is a pattern diagram of the lower cam section in the compression bonding condition viewing from the left side of the laminating apparatus shown in FIG. 11.
Figure 14B:
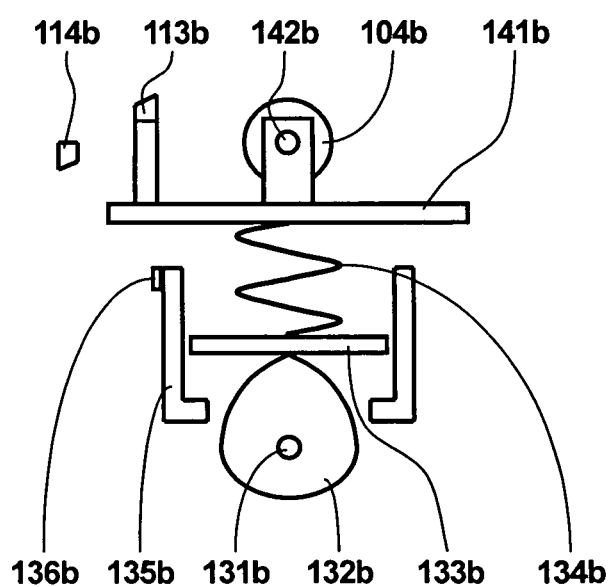
FIG. 14(b) is a partial pattern diagram of the lower cam section in the compression bonding condition viewing from the right side of the lower cam section in FIG. 14(a).
Figure 15:
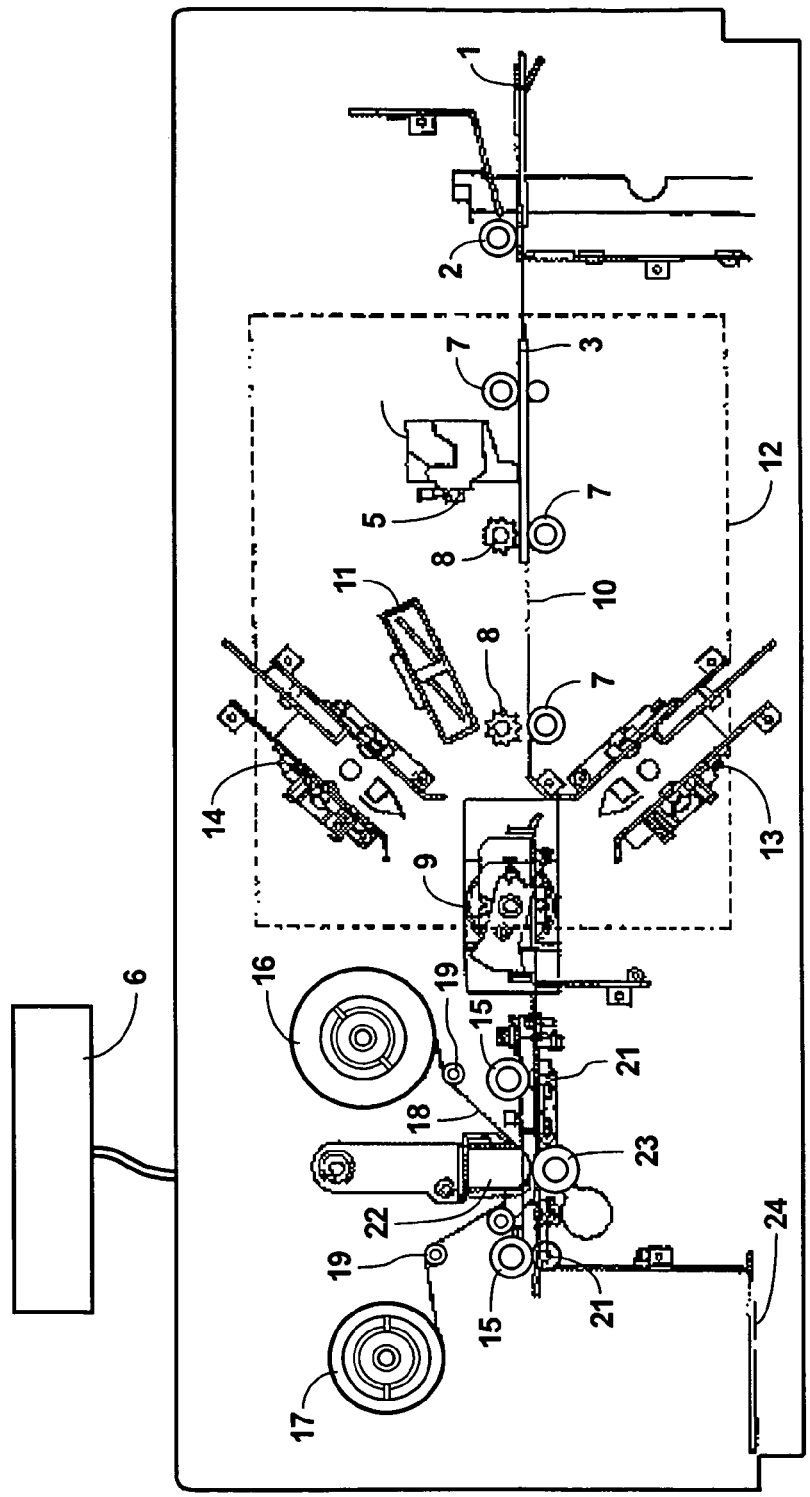
FIG. 15 is a plan view of a card printer according to the prior art.

In case the eccentric cam 132b is rotated furthermore or rotated in a reverse direction, the lower cam section 125b returns to the standby condition shown in FIGS. 12(a) and 12(b) from the compression bonding condition shown in FIGS. 14(a) and 14(b).

As mentioned above, the heat roller 104b moves vertically in the reciprocal motion.

Further, the movable guide 113b is linked to the roller holder 141b, so that the movable guide 113b moves in accordance with movement of the heat roller 104b. However, the fixed guide 114b is isolated from the roller holder 141b, so that the fixed guide 114b never moves.

Furthermore, it is acceptable for the movable guide 113b whether a traveling distance and timing of movement of the movable guide 113b are coincided with those of the heat roller 104b or different from each other. The traveling distance and the timing of movement of the movable guide 113b enable to be controlled by utilizing a spring or a stopper, for example.

In the laminating apparatus 100 according to the first embodiment of the present invention, the heat roller 104b is raised or lowered by pressing the roller holder 141b through the compression spring 134b. In other words, the compression spring 134b intervenes between the heat roller 104b and the driving motor 121b in the lower compression bonding mechanism 105b. Even though a compression bonding stroke and a location of the card 300 fluctuate, the compression spring 134b intervening between the heat roller 104b and the driving motor 121b enables to absorb the fluctuation by elastic deflection of the compression spring 134b.

Accordingly, compression bonding force enables to be stabilized.

On the other hand, in case of the upper compression bonding mechanism 105a, no compression spring intervenes between the heat roller 104a and the upper compression bonding mechanism 105a. In case a compression spring is provided in both the upper and lower compression bonding mechanisms 105a and 105b respectively, a compression bonding location of the card 300 may vary by balance between two compression springs provided in the upper and lower compression bonding mechanisms 105a and 105b, and possibly resulting in generating defects in card transportation and laminating process.

On the contrary, in case of providing only one compression spring for either one of the upper and lower compression bonding mechanisms 105a and 105b, it is realized that fluctuation of a compression bonding stroke and positional fluctuation of the card 300 is absorbed and compression bonding force is stabilized.

Intervening the compression spring in only one of the upper and lower compression bonding mechanisms 105a and 105b enables to stabilize the compression bonding force when the card 300 is held from above and below, and enables to absorb positional fluctuation of the compression bonding location. In addition thereto, the card 300 is stably transported without fluctuating in a location when the laminating process is completed, and the laminating process is stably conducted to the card 300.

Accordingly, the dual-sided laminating apparatus 100 according to the first embodiment of the present invention enables to securely conduct the laminating process.

In case of intervening only one compression spring 134b in the lower compression bonding mechanism 105b as mentioned above, it is acceptable for an upper cam section corresponding to the lower cam section 125b in the upper compression bonding mechanism 105a that an adamant member links between a plate corresponding to the plate 133b and a roller holder corresponding to the roller holder 141b.

Further, in the above-mentioned descriptions, the compression spring 134b is provided for the lower compression bonding mechanism 105b. However, it is acceptable for the configuration of intervening the compression spring in the compression bonding mechanism to be arranged reversely.

More specifically, in the lower compression bonding mechanism 105b, an adamant member links between the plate 133b and the roller holder 141b instead of the compression spring 134b. As against the lower compression bonding mechanism 105b, a compression spring links between the plate and the roller holder in the upper compression bonding mechanism 105a.

Furthermore, it is also acceptable for the compression spring to be replaced by an elastic body such as resin.

As mentioned above, in the laminating apparatus 100 according to the first embodiment of the present invention, the compression bonding process is conducted by intervening an elastic body in either one of the upper and lower compression bonding mechanisms 105a and 105b. In this case, it is possible to delay timing of operation of either one of the upper and lower compression bonding mechanisms 105a and 105b, for example, to delay the timing of operation of either one of the upper and lower compression bonding mechanism 105a and 105b incorporating the compression spring.

More specifically, in case the compression spring 134b is provided for the lower compression bonding mechanism 105b, the lower compression bonding mechanism 105b is operated after the upper compression bonding mechanism 105a is operated. By the delayed operation of the lower compression bonding mechanism 105b, the heat roller 104a compresses the laminate film 107a against the card 300 first, and then the heat roller 104b compresses the laminate film 107b against the card 300. As a specific example, the upper compression bonding mechanism 105a is operated earlier than the lower compression bonding mechanism 105b by about 0.25 to 0.5 seconds. By controlling the timing of operation of the upper and lower compression bonding mechanisms 105a and 105b as mentioned above, the card 300 enables to be compression bonded while a vertical location of the card 300 is fixed.

Controlling the timing of operation of the upper and lower compression bonding mechanisms 105a anti 105b enables to conduct the compression bonding process in higher repeat accuracy.

Accordingly, the patch 107d enables to be securely compression bonded on the card 300.

Further, as mentioned above, the driving motor 121b is a stepping motor. Utilizing the stepping motor enables to control a rotational angle of the eccentric cam 132b accurately.

Accordingly, a vertical location of the heat roller 104b enables to be controlled accurately. In other words, supplying a predetermined number of pulses to the driving motor 121b elevates the heat roller 104b up to a predetermined height.

Furthermore, the roller-position sensor 136b provided for detecting a location of the heat roller 104b is mounted in the lower compression bonding mechanism 105b. The roller-position sensor 136b is such a sensor as a contact sensor that contacts with the roller holder 141b when the heat roller 104b is at the standby location. The roller-position sensor 136b detects that the heat roller 104b is at the standby location or in the standby condition. Consequently, supplying a predetermined number of pulses on the basis of the standby condition to the driving motor 121*b* enables to control a height of the heat roller 104*b* accurately.

More, it is acceptable for the roller-position sensor 136*b* to detect only one condition. Therefore, it is not necessary for the roller-position sensor 136*b* to be provided for each condition even though a number of conditions is increased.

Accordingly, a number of roller-position sensors enables to be reduced, and resulting in reducing a cost of component parts.

[Second Embodiment]

A laminating apparatus according to a second embodiment of the present invention is basically the same as the laminating apparatus 100 according to the first embodiment of the present invention except for locations of heat rollers 104*a* and 104*b* while conducting the laminating process. Therefore, its drawings and detailed descriptions are omitted.

In the laminating apparatus according to the second embodiment of the present invention, the lower compression bonding mechanism 105*b* drives the heat roller 104*b* to be allocated at a first location where the laminate film 107*b* is isolated from the card 300 when the card 300 is transported. When the film mark sensor 115*b* detects the film mark 107*e*, the lower compression bonding mechanism 105*b* drives the heat roller 104*b* to be allocated in a second location where the laminate film 107*b* approaches the transporting path of the card 300 closer than the first location.

In case of transporting a card in higher speed, the card is apt to be deformed easily. Consequently, when a card is transported in higher speed while the card and a laminate film are at close to each other, the card may contact with the laminate film. However, in the laminating apparatus according to the second embodiment of the present invention, the heat roller 104*b* is allocated in the first location where the laminate film 107*b* is isolated from the card 300 when transporting the card 300 in higher speed. Consequently, the card 300 enables to be transported in higher speed.

Further, fluctuation in a carrying-out amount of the laminate film 107*b* from the second location to the compression bonding location enables to be reduced. Consequently, positioning accuracy enables to be improved, and resulting in laminating the patch 107*d* securely on the card 300.

Accordingly, the laminating apparatus according to the second embodiment of the present invention enables to achieve a balance between transporting the card 300 in higher speed and positioning the card 300 accurately.

Effects and the inventive concepts of the present invention are summarized hereinafter.

As shown in FIGS. 4(*a*)-5, the laminating apparatus 100 according to the first embodiment of the present invention is provided with the fixed guide 109*b* that guides the laminate film 107*b* in the upstream side of the heat roller 104*b*, the fixed guide 114*b* that guides the laminate film 107*b* in the downstream side of the heat roller 104*b*, and the movable guide 113*b* that guides the laminate film 107*b* in the upstream side of the fixed guide 114*b* and in the downstream side of the heat roller 104*b* and moves in accordance with movement of the heat roller 104*b*, which approaches or leaves the laminate film 107*b*. Movement of the movable guide 113*b* enables to enlarge the peeling-off angle α of the laminate film 107*b*.

Accordingly, the patch 107*d* enables to be securely laminated on the card 300.

Further, it is acceptable for the laminating apparatus 100 according to the first embodiment of the present invention that the film mark sensor 115*b* detects the film mark 107*e* while the heat roller 104*b* is at the positioning location shown in FIG. 4(*b*). By the above-mentioned configuration of the film mark sensor 115*b*, fluctuation in a carrying-out amount of the laminate film 107*b* from the positioning location to the compression bonding location enables to be reduced.

Accordingly, positioning accuracy enables to be improved, and resulting in laminating the patch 107*d* securely and accurately on the card 300.

Furthermore, in the laminating apparatus 100 according to the first embodiment of the present invention, in case of passing the card 300 without laminating, it is acceptable that the heat roller 104*b* is made to be at the standby location as shown in FIG. 4(*a*). Such a configuration of the heat roller 104*b* enables to prevent a warped card 300 from contacting with the laminate film 107*b*.

Accordingly, it is possible for the card 300 to be transported in higher speed.

As shown in FIG. 2, the laminating apparatus 100 according to the first embodiment of the present invention is a dual-sided laminating apparatus in which the supply reels 106*a* and 106*b*, heat rollers 104*a* and 104*b*, the upper and lower compression bonding mechanisms 105*a* and 105*b*, and the take up reels 112*a* and 112*b* are allocated above and under the card 300 respectively. In such a dual-sided laminating apparatus, it is acceptable that either one of the upper and lower compression bonding mechanisms 105*a* and 105*b* moves the corresponding heat roller 104*a* or 104*b* vertically downward or upward through the compression spring provided in the upper or lower compression bonding mechanism 105*a* or 105*b*. Such a configuration enables to conduct the laminating process while the vertical location of the card 300 is fixed.

Accordingly, the compression bonding process enables to be conducted in higher repeat accuracy, and resulting in enabling to laminate securely.

In the above-mentioned dual-sided laminating apparatus 100, it is acceptable that the lower compression bonding mechanism 105*b* provided with the compression spring 134*b* shifts the heat roller 105*b* to the compression bonding location later than the upper compression bonding mechanism 105*a* provided with no compression spring. Such a configuration enables to conduct the laminating process while the vertical location of the card 300 is fixed.

Accordingly, the compression bonding process enables to be conducted in higher repeat accuracy, and resulting in enabling to laminate securely.

More, in the above-mentioned dual-sided laminating apparatus 100, in case the laminating process is conducted to only one surface of the card 300 by removing a laminate film 107 from either one of the supply reels 106*a* and 106*b*, it is acceptable for tension of the laminate film 107 caused by a take up reel to be set so as to be higher than tension caused by laminating on both surfaces of the card 300.

Accordingly, such a configuration of setting higher tension enables to increase force for taking up the laminate film 107 even in the dual-sided laminating apparatus, and resulting in enabling to laminate securely.

Moreover, in the laminating apparatus 100 according to the first embodiment of the present invention, it is preferable for tension of the laminate films 107*a* and 107*b* caused by the supply reels 106*a* and 106*b* to be 5 to 10 N.

Accordingly, setting the tension to be 4 to 10 N enables to increase force for taking up the laminate film 107, and resulting in enabling to laminate securely.

And furthermore, in the laminating apparatus 100 according to the first embodiment of the present invention, it is preferable for the curvature radius of each contacting surface of the fixed guides 109*a* and 109*b* contacting with the laminating films 107*a* and 107*b* respectively to be 5 mm or more.

Accordingly, setting the curvature radius to 5 mm or more enables to prevent a laminate material or patch 107*d* from accidental peeling off prior to conducting the laminating process, and resulting in enabling to laminate securely.

In addition thereto, when transporting a card in higher speed, the card is apt to be deformed easily. Consequently, when a card is transported in higher speed while the card and a laminate film are at close to each other, the card may contact with the laminate film. However, in the laminating apparatus according to the second embodiment of the present invention, the heat roller 104*b* is allocated in the first location where the laminate film 107*b* is isolated from the card 300 when transporting the card 300 in higher speed.

Accordingly, the card 300 enables to be transported in higher speed.

Further, fluctuation in a carrying-out amount of the laminate film 107*b* from the second location to the compression bonding location enables to be reduced. Consequently, positioning accuracy enables to be improved, and resulting in laminating the patch 107*d* securely on the card 300.

Accordingly, the laminating apparatus according to the second embodiment of the present invention enables to achieve a balance between transporting the card 300 in higher speed and positioning the card 300 accurately.

As mentioned above, the present invention provides the laminating apparatus and the laminating method for securely conducting the laminating process, and further provides the printing apparatus that incorporates the laminating apparatus and is operated under the laminating method.

While the invention has been described above with reference to the specific embodiment thereof, it is apparent that many changes, modifications and variations in the arrangement of equipment and devices can be made without departing from the invention concept disclosed herein.

For instance, the laminating apparatus according to the first and second embodiments of the present invention is the dual-sided laminating apparatus. However, it is apparent that the above-mentioned configuration of the laminating apparatus enables to be applied for not only the double-sided laminating apparatus, which laminates both surfaces of a card simultaneously, but also a single-sided laminating apparatus, which laminates only one surface of the card.

It will be apparent to those skilled in the art that various modification and variations could be made in the present invention without departing from the scope or spirit of the invention.

What is claimed is:

1. A laminating apparatus for laminating a laminate material provided on a film onto a card comprising:
    means for transporting the card;
    means for supplying the film so as to overlap the film with the card transported by the means for transporting the card;
    means for thermally compression bonding the laminate material on the film overlapped with the card onto the card;
    means for driving the means for thermally compression bonding the laminate material on the film to move from a standby location where the means for thermally compression bonding the laminate material is separated from the film to a compression bonding location where the laminate material is thermally compression bonded on the card;
    means for taking up the film overlapped with the card;
    a first guide for guiding the film in a supply side of the film before the means for thermally compression bonding the laminate material;
    a second guide for guiding the film in a take-up side of the film behind the means for thermally compression bonding the laminate material; and
    a movable third guide for guiding the film in an upstream side of the second guide and in a downstream side of the means for thermally compression bonding the laminate material, wherein the movable third guide moves in accordance with movement of the means for thermally compression bonding the laminate material that is driven by the means for driving the means for thermally compression bonding the laminate material.

2. The laminating apparatus according to claim 1, further comprising:
    means for detecting a film mark provided on the film,
    wherein the means for detecting a film mark detects the film mark when the means for driving the means for thermally compression bonding the laminate material drives the means for thermally compression bonding the laminate material to be at a positioning location between the standby location and the compression bonding location.

3. The laminating apparatus according to claim 1, wherein the card is passed through the laminating apparatus without laminating while the means for thermally compression bonding the laminate material remains at the standby location.

4. The laminating apparatus according to claim 1, wherein each of the means for supplying the film, the means for thermally compression bonding the laminate material, the means for driving the means for thermally compression bonding the laminate material and the means for taking up the film is provided above and below the card respectively, and
    wherein either one of the means for driving the means for thermally compression bonding the laminate material respectively provided above and below the card drives the means for thermally compression bonding the laminate material to move by means of an elastic body.

5. The laminating apparatus according to claim 4, wherein the one means for driving a means for thermally compression bonding the laminate material on the film provided with the elastic body shifts the means for thermally compression bonding the laminate material to the compression bonding location after the other means for driving another means for thermally compression bonding the laminate material provided with no elastic body shifts the other means for thermally compression bonding the laminate material to the compression bonding location.

6. The laminating apparatus according to claim 4, wherein tension of the film caused by the means for taking up the film while laminating a laminate film on one surface of the card is set to be higher than that of laminating on both surfaces of the card when laminating a laminate material on only one surface of the card by removing the film from either one of the means for supplying the film provided above and below the card.

7. The laminating apparatus according to claim 1, wherein the tension of the film caused by the film taking-up means is 5 to 10 N.

8. The laminating apparatus according to claim 1, wherein a curvature radius of a contacting surface contacting with the film of the first guide is 5 mm or more.

9. A laminating apparatus for laminating a laminate material provided on a film onto a card comprising:
    means for transporting the card;
    means for supplying the film so as to overlap the film with the card transported by the means for transporting the card;

means for thermally compression bonding the laminate material on the film overlapped with the card onto the card;
means for driving the means for thermally compression bonding the laminate material to approach or leave the card;
means for taking up the film overlapped with the card; and
means for detecting a film mark provided on the film so as to position the laminate material,
wherein the means for driving the means for thermally compression bonding the laminate material drives the means for thermally compression bonding the laminate material to move to a first location separated from a transporting path of the card when transporting the card, and
wherein the means for driving the means for thermally compression bonding the laminate material drives the means for thermally compression bonding the laminate material to move to a second location close to the transporting path of the card more than the first location when detecting the film mark by the means for detecting a film mark.

10. A printing apparatus comprising:
the laminating apparatus according to claim 1; and
a card printer conducting a printing process to a card and supplying the printed card to the laminating apparatus.

* * * * *